United States Patent
Rossoni et al.

(10) Patent No.: US 6,487,417 B1
(45) Date of Patent: Nov. 26, 2002

(54) METHOD AND SYSTEM FOR CHARACTERIZING PROPAGATION OF RADIOFREQUENCY SIGNAL

(75) Inventors: Philip G. Rossoni, Belmont, MA (US); Pablo Vicharelli, Carlisle, MA (US); Pete A. Boyer, Somerville, MA (US); David Freeman, Billerica, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/448,956

(22) Filed: Nov. 24, 1999

(51) Int. Cl.[7] ................................................ H04Q 7/20
(52) U.S. Cl. ...................... 455/456; 455/67.6; 455/506; 455/65
(58) Field of Search .................. 455/67.6, 456, 455/504, 506, 301, 63, 65, 272, 101

(56) References Cited

U.S. PATENT DOCUMENTS

| | | | | |
|---|---|---|---|---|
| 5,602,903 A | * | 2/1997 | LeBlanc et al. | 379/60 |
| 5,953,669 A | * | 9/1999 | Stratis et al. | 455/449 |
| 6,026,304 A | * | 2/2000 | Hilsenrath et al. | 455/456 |
| 6,249,680 B1 | * | 6/2001 | Wax et al. | 455/456 |
| 6,282,426 B1 | * | 8/2001 | Wang | 455/456 |
| 6,317,599 B1 | * | 11/2001 | Rappaport et al. | 455/446 |
| 6,356,758 B1 | * | 3/2002 | Almeida et al. | 455/446 |
| 2002/0006799 A1 | * | 1/2002 | Rappaport et al. | 455/446 |

* cited by examiner

*Primary Examiner*—Daniel Hunter
*Assistant Examiner*—Lana Le
(74) *Attorney, Agent, or Firm*—Leonard Charles Suchyta; James K. Weixel

(57) ABSTRACT

A method, executed on a simulation system (20), characterizes propagation of a radiofrequency signal (56) in a three-dimensional environment (52). The method includes forming a database (42) of propagation paths (54) of the radiofrequency signal (56) transmitted from a transmitter (58) at a fixed location (66) in the three-dimensional environment (52). The propagation paths (54) are represented by a plurality of line segments (120, 122) in the database (42). Local line segments (188) are selected from the plurality of line segments (120, 122) to establish a subset (47) of the propagation paths (54). The subset (47) includes those propagation paths (54) each having one of the local line segments (188) proximate a location (182) of a receiver (72) in the environment (52). Distinct multipath components (246) representing distinct wavefronts of the radiofrequency signal (56) are subsequently identified from the subset (47) of the propagation paths (54).

43 Claims, 15 Drawing Sheets

| | TRANSMITTER ID: T1 | ANGLE OF SEPARATION: 0.2 | REFLECTION THRESHOLD: 3 | | | |
|---|---|---|---|---|---|---|
| PROPAGATION PATH | START LOCATION COORDINATES | | PROPAGATION DIRECTION (DEGREES) | | DISTANCE TO TX | END LOCATION COORDINATES |
| | $X_s$ $Y_s$ $Z_s$ | | AZI. | ELEV. | | $X_e$ $Y_e$ $Z_e$ |
| PATH A: | | | | | | |
| A1 | $X_0$ $Y_0$ $Z_0$ | | $\angle a$ | $\angle b$ | 0 | $X_1$ $Y_1$ $Z_1$ |
| A2 | $X_1$ $Y_1$ $Z_1$ | | $\angle c$ | $\angle d$ | d1 | $X_2$ $Y_2$ $Z_2$ |
| PATH B: | | | | | | |
| B1 | $X_0$ $Y_0$ $Z_0$ | | $\angle e$ | $\angle f$ | 0 | $X_3$ $Y_3$ $Z_3$ |
| B2 | $X_3$ $Y_3$ $Z_3$ | | $\angle g$ | $\angle h$ | d2 | $X_4$ $Y_4$ $Z_4$ |
| PATH C: | | | | | | |
| C1 | $X_0$ $Y_0$ $Z_0$ | | $\angle i$ | $\angle j$ | 0 | $X_5$ $Y_5$ $Z_5$ |
| PATH D: | | | | | | |
| D1 | $X_0$ $Y_0$ $Z_0$ | | $\angle k$ | $\angle l$ | 0 | $X_6$ $Y_6$ $Z_6$ |
| D2 | $X_6$ $Y_6$ $Z_6$ | | $\angle m$ | $\angle n$ | d3 | $X_7$ $Y_7$ $Z_7$ |
| D3 | $X_7$ $Y_7$ $Z_7$ | | $\angle o$ | $\angle p$ | d3+d4 | $X_8$ $Y_8$ $Z_8$ |
| PATH E: | | | | | | |
| E1 | $X_0$ $Y_0$ $Z_0$ | | $\angle q$ | $\angle r$ | 0 | $X_9$ $Y_9$ $Z_9$ |
| E2 | $X_9$ $Y_9$ $Z_9$ | | $\angle s$ | $\angle t$ | d5 | $X_{10}$ $Y_{10}$ $Z_{10}$ |
| PATH F: | | | | | | |
| F1 | $X_0$ $Y_0$ $Z_0$ | | $\angle u$ | $\angle v$ | 0 | $X_{11}$ $Y_{11}$ $Z_{11}$ |
| F2 | $X_{11}$ $Y_{11}$ $Z_{11}$ | | $\angle w$ | $\angle x$ | d6 | $X_{12}$ $Y_{12}$ $Z_{12}$ |
| PATH G: | | | | | | |
| G1 | $X_0$ $Y_0$ $Z_0$ | | $\angle y$ | $\angle z$ | 0 | $X_{13}$ $Y_{13}$ $Z_{13}$ |
| G2 | $X_{13}$ $Y_{13}$ $Z_{13}$ | | $\angle aa$ | $\angle bb$ | d7 | $X_{14}$ $Y_{14}$ $Z_{14}$ |
| PATH H: | | | | | | |
| H1 | $X_0$ $Y_0$ $Z_0$ | | $\angle cc$ | $\angle dd$ | 0 | $X_{15}$ $Y_{15}$ $Z_{15}$ |
| H2 | $X_{15}$ $Y_{15}$ $Z_{15}$ | | $\angle ee$ | $\angle ff$ | d8 | $X_{16}$ $Y_{16}$ $Z_{16}$ |
| H3 | $X_{16}$ $Y_{16}$ $Z_{16}$ | | $\angle gg$ | $\angle hh$ | d8+d9 | $X_{17}$ $Y_{17}$ $Z_{17}$ |
| H4 | $X_{17}$ $Y_{17}$ $Z_{17}$ | | $\angle ii$ | $\angle jj$ | d8+d9+d10 | $X_{18}$ $Y_{18}$ $Z_{18}$ |
| ⋮ | | | | | | |
| PATH n: | | | | | | |

FIG. 6

| TRANSMITTER ID: T1 | RECEIVER LOCATION: $X_r$ $Y_r$ $Z_r$ | | | | | | | |
|---|---|---|---|---|---|---|---|---|
| MULTIPATH COMPONENTS | START LOCATION COORDINATES | | | PROPAGATION DIRECTION | | DISTANCE TO TX | END LOCATION COORDINATES | | |
| | $X_s$ | $Y_s$ | $Z_s$ | AZI. | ELEV. | | $X_e$ | $Y_e$ | $Z_e$ |
| PATH B: | | | | | | | | | |
| B1 | $X_0$ | $Y_0$ | $Z_0$ | $\angle e$ | $\angle f$ | 0 | $X_3$ | $Y_3$ | $Z_3$ |
| *B2 | $X_3$ | $Y_3$ | $Z_3$ | $\angle g$ | $\angle h$ | d2 | $X_4$ | $Y_4$ | $Z_4$ |
| PATH D: | | | | | | | | | |
| D1 | $X_0$ | $Y_0$ | $Z_0$ | $\angle k$ | $\angle l$ | 0 | $X_6$ | $Y_6$ | $Z_6$ |
| *D2 | $X_6$ | $Y_6$ | $Z_6$ | $\angle m$ | $\angle n$ | d3 | $X_7$ | $Y_7$ | $Z_7$ |
| D3 | $X_7$ | $Y_7$ | $Z_7$ | $\angle o$ | $\angle p$ | d3+d4 | $X_8$ | $Y_8$ | $Z_8$ |
| PATH E: | | | | | | | | | |
| *E1 | $X_0$ | $Y_0$ | $Z_0$ | $\angle q$ | $\angle r$ | 0 | $X_9$ | $Y_9$ | $Z_9$ |
| E2 | $X_9$ | $Y_9$ | $Z_9$ | $\angle s$ | $\angle t$ | d5 | $X_{10}$ | $Y_{10}$ | $Z_{10}$ |
| PATH F: | | | | | | | | | |
| *F1 | $X_0$ | $Y_0$ | $Z_0$ | $\angle u$ | $\angle v$ | 0 | $X_{11}$ | $Y_{11}$ | $Z_{11}$ |
| F2 | $X_{11}$ | $Y_{11}$ | $Z_{11}$ | $\angle w$ | $\angle x$ | d6 | $X_{12}$ | $Y_{12}$ | $Z_{12}$ |
| PATH G: | | | | | | | | | |
| G1 | $X_0$ | $Y_0$ | $Z_0$ | $\angle y$ | $\angle z$ | 0 | $X_{13}$ | $Y_{13}$ | $Z_{13}$ |
| *G2 | $X_{13}$ | $Y_{13}$ | $Z_{13}$ | $\angle aa$ | $\angle bb$ | d7 | $X_{14}$ | $Y_{14}$ | $Z_{14}$ |

FIG. 9

| LIST OF MULTIPATH COMPONENTS 204 | LOCAL LINE SEGMENT 206 | CLOSEST POINT COORDINATES 208 | | | DISTANCE TO RX ($d_{cr}$) 210 | QTY. OF LINE SEG. 212 | SEG. LENGTH (1 seg) 214 | PATH LENGTH (1 path) 216 |
|---|---|---|---|---|---|---|---|---|
| | | $X_c$ | $Y_c$ | $Z_c$ | | | | |
| PATH B: | B2 | $X_{Bc}$ | $Y_{Bc}$ | $Z_{Bc}$ | $d_{Br}$ (2) | 2 | 1B2 | d2 + 1B2 |
| PATH D: | D2 | $X_{Dc}$ | $Y_{Dc}$ | $Z_{Dc}$ | $d_{Dr}$ (3) | 2 | 1D2 | d3 + 1D2 |
| PATH E: | E1 | $X_{Ec}$ | $Y_{Ec}$ | $Z_{Ec}$ | $d_{Er}$ | 1 | - | - |
| PATH F: | F1 | $X_{Fc}$ | $Y_{Fc}$ | $Z_{Fc}$ | $d_{Fr}$ (1) | 1 | - | - |
| PATH G: | G2 | $X_{Gc}$ | $Y_{Gc}$ | $Z_{Gc}$ | $d_{Gr}$ | 2 | 1B2 | d7 + 1G2 |

FIG. 12

METHOD AND SYSTEM FOR CHARACTERIZING PROPAGATION OF RADIOFREQUENCY SIGNAL

TECHNICAL FIELD OF THE INVENTION

The present invention relates to the field of simulating the propagation of radiofrequency signals. More specifically, the present invention relates to identifying multipath components of a radiofrequency signal within a three-dimensional environment.

BACKGROUND OF THE INVENTION

In wireless communications systems, such as cellular, Personal Communications Services, and so forth, base stations are located such that radio signals are available throughout the service area. As a radiofrequency signal propagates from a transmitter, the signal can reach the receiving antenna by two or more paths (i.e., multipaths). This phenomena is especially evident in cluttered environments, such as in urban areas containing many tall buildings. The effects of multipaths are signal distortions due to signal interference at the receiver because of differences in arrival times and received power for waves with propagation paths of different lengths, differences in Doppler shift at a moving receiver or paths with different angles of arrival, and so forth. Predicting multipaths of a radiofrequency signal and their effect on radio signal quality is a daunting endeavor.

A number of tools have been developed which make use of terrain data, with building clutter information, satellite imagery, and so forth. This data is used in conjunction with models which use base and subscriber heights, along with a description of the terrain to predict multipath effects for the locations under consideration.

Such models may work adequately for large cells whose base antennas are well above the height of the terrain and the building clutter, so the influence of particular terrain, buildings, or groups of buildings is minimal. However, when the base station antennas are near rooftop level or below building rooftops, then the size and shape of the buildings significantly influence the radiofrequency signals as they propagate down the streets and reflect off of the buildings.

Ray tracing processes attempt to model the propagation of radiofrequency signals as rays radiating from the transmitter to the receiver. Within ray tracing there are two generally known approaches. The first is called the "shooting-and-bouncing" method, in which a fixed number of rays are launched from a transmitter, then forward-traced to follow the different propagation paths, with a ray being terminated when it hits a detection sphere at the receiver. A problem with this method is that the location of not only the transmitter but also the receiver must be known prior to forward-tracing the propagation paths. Thus, the rays have to be launched and traced again in all directions for each additional receiver location. This could mean hours or even days of computation time for a practical outdoor environment. Another problem arises with identifying which of the multipaths represent distinct wavefronts. In a radiofrequency signal, the wavefront is the surface that is defined by the locus of points that have the same phase, i.e., the same path length, from the source. If more than one propagation path represents the same wavefront, these propagation paths may be counted as contributions to the overall power at the receiver location, resulting in an inaccurately optimistic power level calculation for the receiver location.

The second approach is based on image theory. The basic assumption in image theory is that the images of a source at a fixed location in a given environment are independent of the location of the receiver as long as there are planar surfaces in the environment. Therefore one can build all the images for a given location of the transmitter and environment and reuse it for as many receiver locations as one needs. This represents an improvement in terms of computational efficiency; however, the image method becomes too cumbersome with large numbers of randomly oriented polygons in the environment.

A conventional image theory approach is to first determine an image tree (hierarchically organized for ease of use) based on the location of the transmitter in the environment and the environment itself. The environment consists of reflective surfaces and corners. Starting from the transmitter ("parent" image), each reflective surface or corner has the potential of generating a "child" image from the parent image. Each child image can further generate child images for every reflective surface and every corner. Once the image tree is built, for a given receiver location, every image on the tree is examined to see whether it contributes to the total received power through a back-tracing process from the receiver to the transmitter. A problem with image tracing is the large size of the image tree for a realistic outdoor environment leads to very large computational and memory requirements.

In order to limit the size of the image tree, one prior art image tree method creates a parent image node associated with the transmitter. Child image nodes are created in the image tree only for each object (i.e., reflective surface or diffractive corner) that can redirect a propagating signal from the transmitter when the power received at the object exceeds a threshold. The power in the reflected signal depends on the distance traveled to the object, the incident angle with the panel, and the reflection coefficient of object. Accordingly, the size of the image tree created using this approach is significantly reduced from prior art image trees. Unfortunately, since power computations have to be performed for every object and every propagating signal, again the problem arises of prohibitively long computation time to create the image tree.

SUMMARY OF THE INVENTION

Accordingly, it is an advantage of the present invention that a method and system for characterizing propagation of a radiofrequency signal in a three-dimensional environment are provided.

It is another advantage of the present invention that the method and system allow a database of propagation paths to be created separate from the selection of multipaths at a receiver location.

It is another advantage of the present invention that the database can be used to select multipaths at any of a number of receiver locations.

It is another advantage of the present invention that the method and system readily select multipath components in the absence of power calculations.

Yet another advantage of the present invention is that the method and system identify distinct wavefronts at a receiver location.

The above and other advantages of the present invention are carried out in one form by a method for characterizing propagation of a radiofrequency signal in a three-dimensional environment. The method calls for forming a database of propagation paths of the radiofrequency signal transmitted from a transmitter at a fixed location in the three-dimensional environment, the propagation paths being represented by a plurality of line segments in the database. Local line segments are selected from the plurality of line segments to establish a subset of the propagation paths, the local line segments being proximate a location of a receiver in the three-dimensional environment, and each of the propagation paths of the subset including one of the local line segments. The method further calls for identifying distinct multipath components of the radiofrequency signal from the subset of the propagation paths.

The above and other advantages of the present invention are carried out in another form by a system for determining propagation characteristics of a radiofrequency signal between a transmitter location and each of a plurality of receiver locations in a three-dimensional environment. The system includes a memory element having a database of propagation paths stored therein. The propagation paths are represented by a plurality of line segments, and the propagation paths originate at the transmitter location and radially project from the transmitter location along an azimuth and an elevation such that adjacent ones of the propagation paths are spaced apart by an angle of separation. The system further includes a location coordinates receiver for one of the receiver locations, and a segment selector for selecting, in response to the location coordinates, local line segments from the plurality of line segments in the database to establish a subset of the propagation paths, the local line segments being proximate the one receiver location, and each of the propagation paths of the subset including one of the local line segments.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 6 shows a table of an exemplary propagation path database;

FIG. 9 shows a table of an exemplary subset of propagation paths;

FIG. 12 shows a table of an exemplary list of multipath components;

DETAILED DESCRIPTION OF THE PREFERRED EMBODIMENTS

Figure 1:
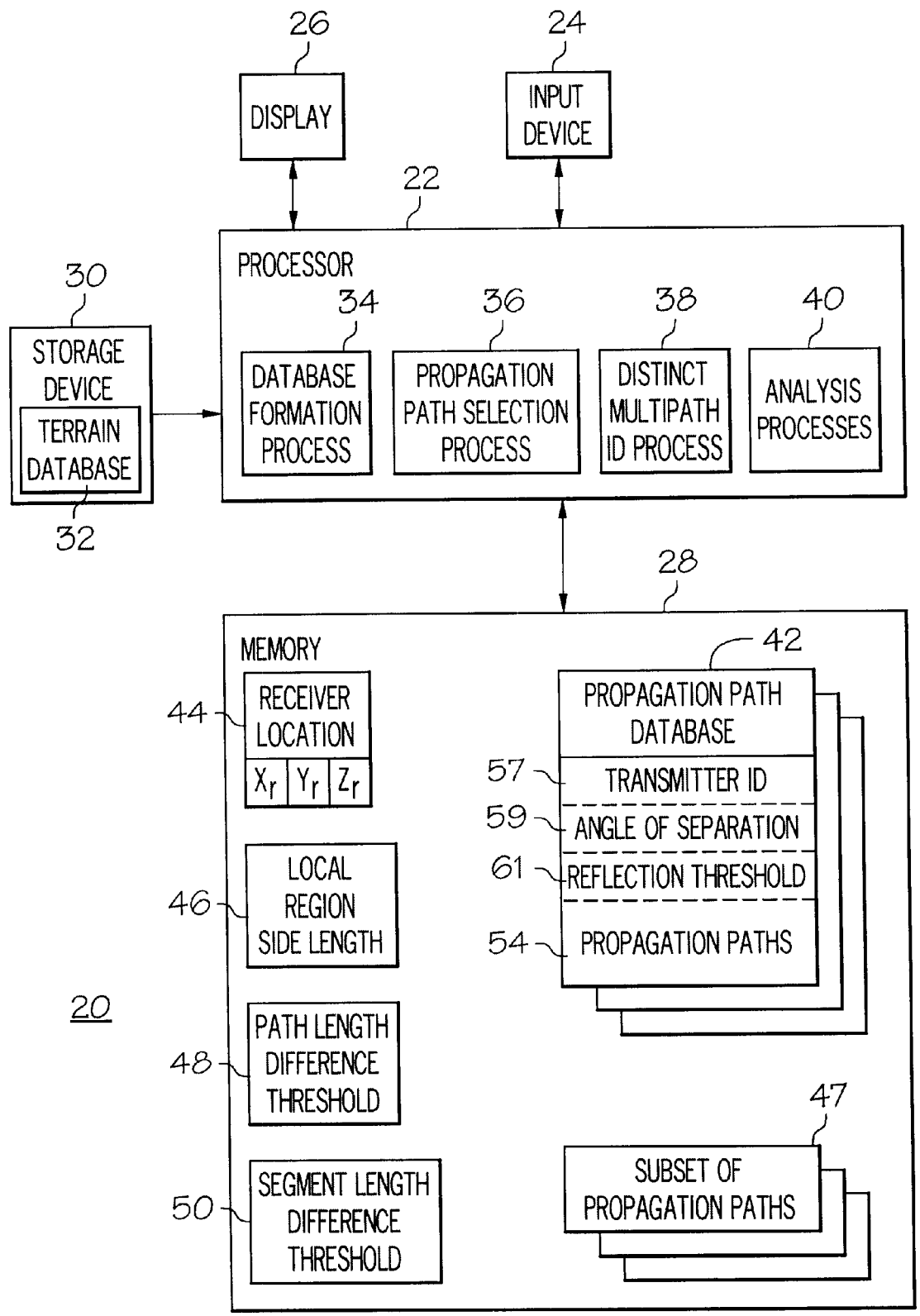
FIG. 1 shows a block diagram of a system for determining radiofrequency signal propagation characteristics.

FIG. 1 shows a block diagram of a system 20 for determining radiofrequency signal propagation characteristics. System 20 is capable of determining radiofrequency signal propagation characteristics between selectable locations around natural features and architectural structures, such as buildings, bridges, and so forth.

System 20 includes a processor 22, an input device 24, a display 26, and a memory element 28. Input device 24 may be a keyboard, mouse, trackball, joystick, touch sensitive tablet or screen, or a combination thereof for entering data and commands into processor 22. Display 26 may be implemented utilizing any known means for displaying textual, graphical, or video images from processor 22. Memory element 28 is addressable storage space, accessible by processor 22, which stores information or instructions for use.

Processor 22 also includes a data reader (not shown) for reading data, such as a terrain database 32, from a storage device 30. The data reader may include a hard disk drive internal or external to processor 22, a tape drive, floppy disk drive, CD-ROM, or a combination thereof. Storage device 30 may be a floppy disk, a compact disk, a personal computer memory card international association (PCMCIA) card, and the like. The components of system 20 discussed above may be implemented utilizing several known off-the-shelf components.

Processor 22 is capable of executing some or all of a number of software routines, for example, a database formation process 34, a propagation path selection process 36, a distinct multipath identification (ID) process 38, and analysis processes 40. In addition, memory 28 has stored therein some or all of the following data, for example, a propagation path database 42 formed through the execution of database formation process 34, receiver location coordinates 44 and a local region side length 46 established during the execution of propagation path selection process 36, a subset 47 of propagation paths formed during the execution of process 36, and a path length difference threshold 48 and a segment length difference threshold 50 formed during the execution of distinct multipath identification process 38.

The foregoing processes and data will be described in further detail below. In addition, the foregoing processes and the resulting data will be described as being executed through a single processor 22. However, it should become evident through the following description, that some processes may be executed on system 20 while subsequent processes may be executed on a different processor system or systems.

Figure 2:
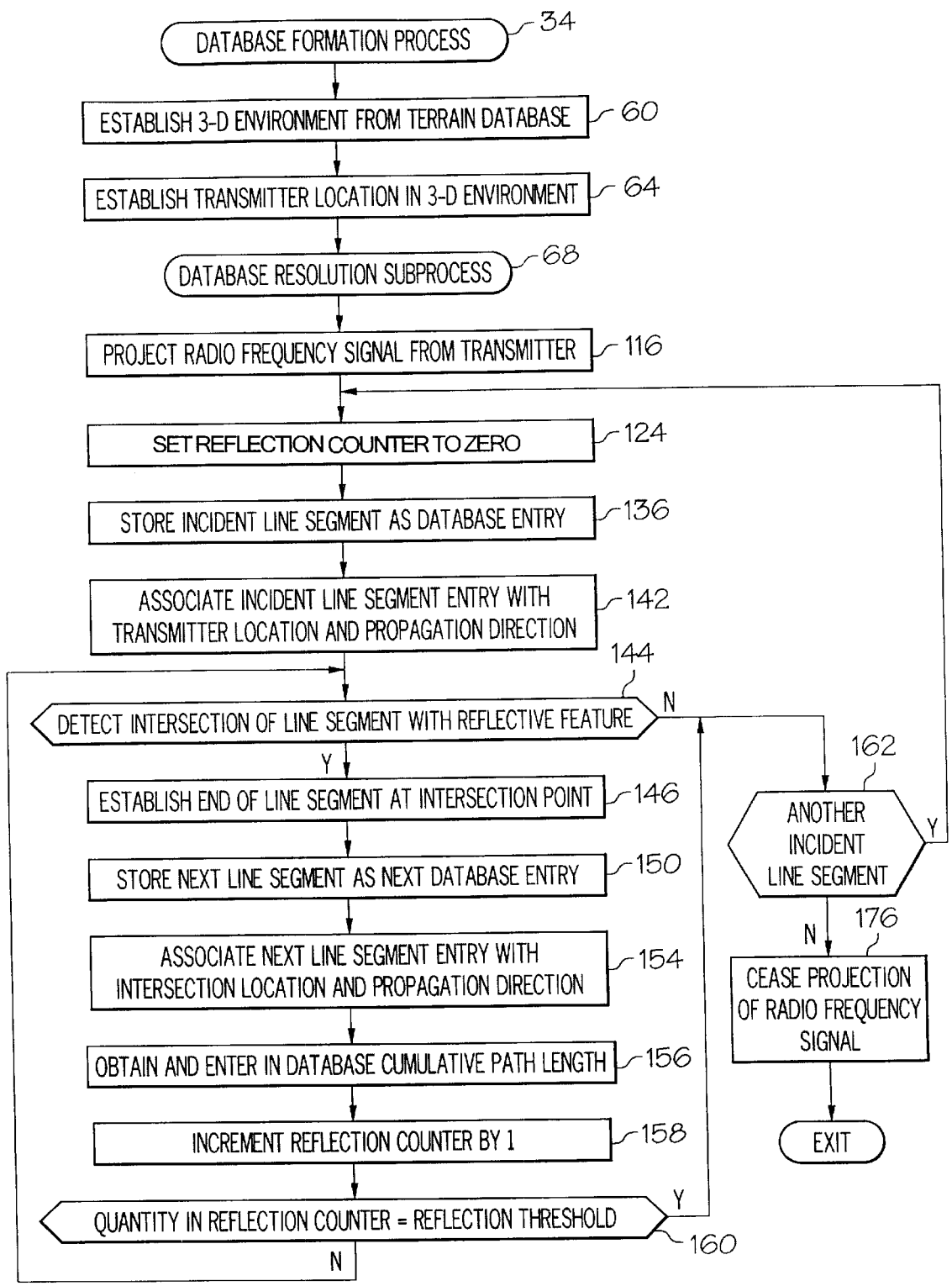
FIG. 2 shows a flow chart of a database formation process.
Figure 3:
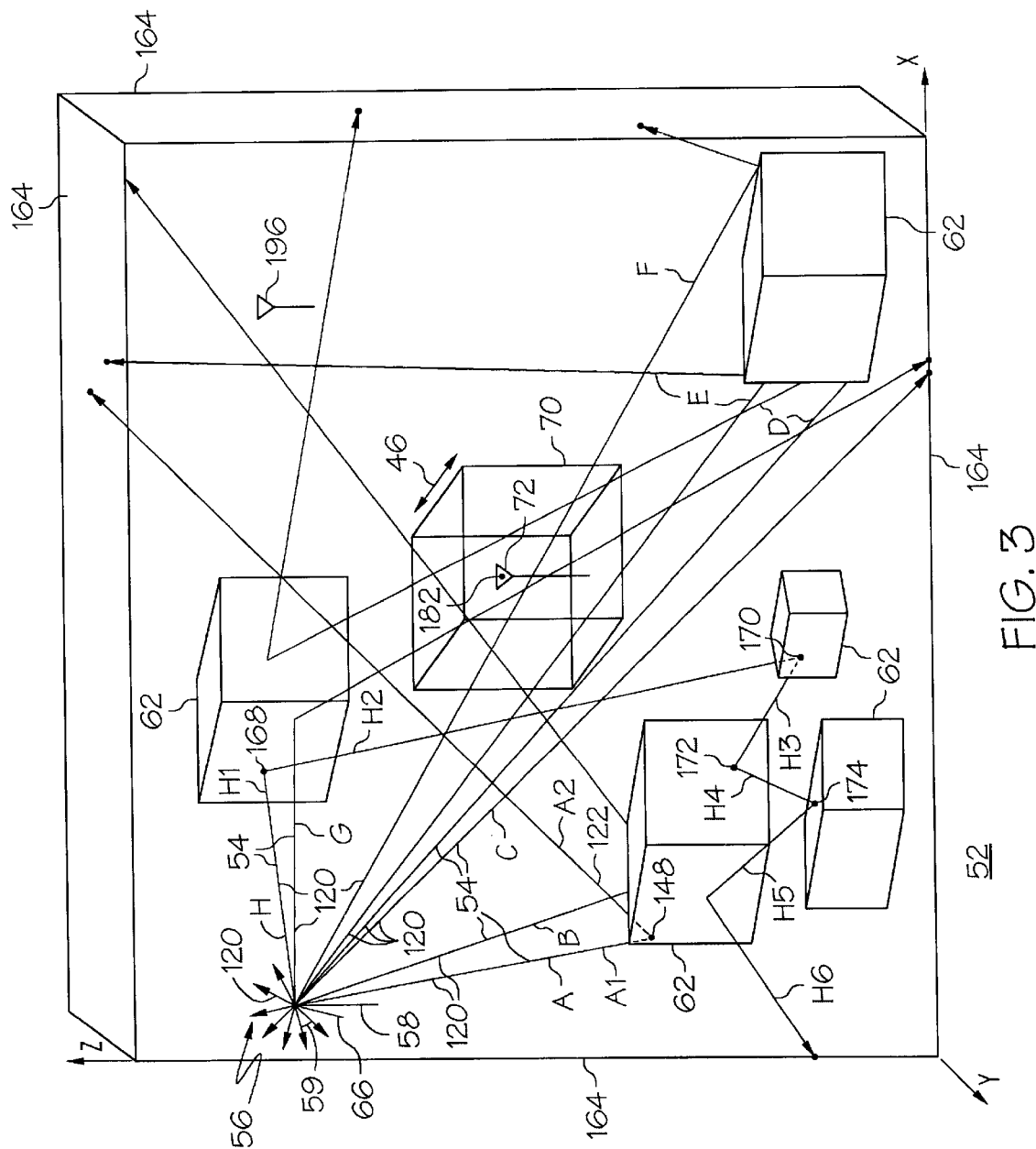
FIG. 3 shows a diagram of a portion of a simplified three-dimensional environment showing propagation paths of a radiofrequency signal projecting from a transmitter.

Referring to FIGS. 2 and 3, FIG. 2 shows a flow chart of database formation process 34. FIG. 3 shows a diagram of a simplified three-dimensional environment 52 showing propagation paths 54 of a radiofrequency signal 56 projecting from a transmitter 58. Process 34 is executed by processor 22 (FIG. 1) in order to create propagation path database 42 (FIG. 1) specific to transmitter 58. Database 42 includes propagation paths 54 originating at transmitter 58 in three-dimensional environment 52. In addition, process 34 may be executed a number of times in order to create a number of databases specific to a number of transmitters.

Referring momentarily to FIG. 1, database 42 also includes a transmitter identifier (ID) 57 particular to transmitter 58, an angle of separation 59, and a reflection threshold 61 associated with propagation paths 54, which will described in further detail below. Once formed, database 42 is accessed to determine propagation characteristics of radiofrequency signal 56 projecting from transmitter 58 and arriving proximate any receiver location within three-dimensional environment 52.

Referring back to FIGS. 2–3, process 34 begins with a task 60. Task 60 causes processor 22 to establish three-dimensional environment 52 from terrain database 32 (FIG. 1). In other words, processor 22 accesses storage device 30 (FIG. 1) to obtain terrain database 32. Terrain database 32 includes a plurality of polygons 62 that represent the natural terrain and buildings of an actual environment of interest, such as a city. Polygons 62 of three-dimensional environment 52 are reflective features. In other words, when radiofrequency signal 56 projects along one of propagation paths 54 and intersects one of reflective polygons 62, radiofrequency signal 56 will be reflected off of polygon 62. Environment 52 (FIG. 3) illustrates a few cubic polygons 62 for convenience. Polygons 62 may be as numerous and as complex as necessary to represent the actual environment of interest with a desired degree of accuracy.

Following task 60, a task 64 is performed. In task 64, processor 22 establishes a fixed location 66 and transmitter ID 57 (FIG. 1) for transmitter 58 in three-dimensional environment 52. Transmitter location 66 may be input by a user through input device 24 (FIG. 1). Alternatively, processor 22 may establish location 66 in response to an antenna location optimization routine (not shown) that may be employed to determine suitable locations for transmitting and receiving antennas of base stations.

Following task 64, a database resolution subprocess 68 is performed. Through the execution of subprocess 68, the resolution, i.e., the level of detail, of database 42 is established. Subprocess 68 is performed to determine angle of separation 59 between adjacent propagation paths 54 so that a sufficient number of propagation paths 54 will intersect a cubic local region 70. (FIG. 3), surrounding a receiver 72 (FIG. 3) in three-dimensional environment 52. Cubic local region 70 is a cube shaped volume of space bounded by six equal squares, each of the squares having a common side length, referred to herein as local region side length 46 (FIG. 1).

In addition, subprocess 68 is performed to establish reflection threshold 61 (FIG. 1). Reflection threshold 61 is the maximum quantity of reflections from reflective polygons 62 allowable for each of propagation paths 54. Thus, subprocess 68 establishes the resolution of database 42 in response to transmitter location 66 and the actual features of three-dimensional environment 52.

Figure 4:
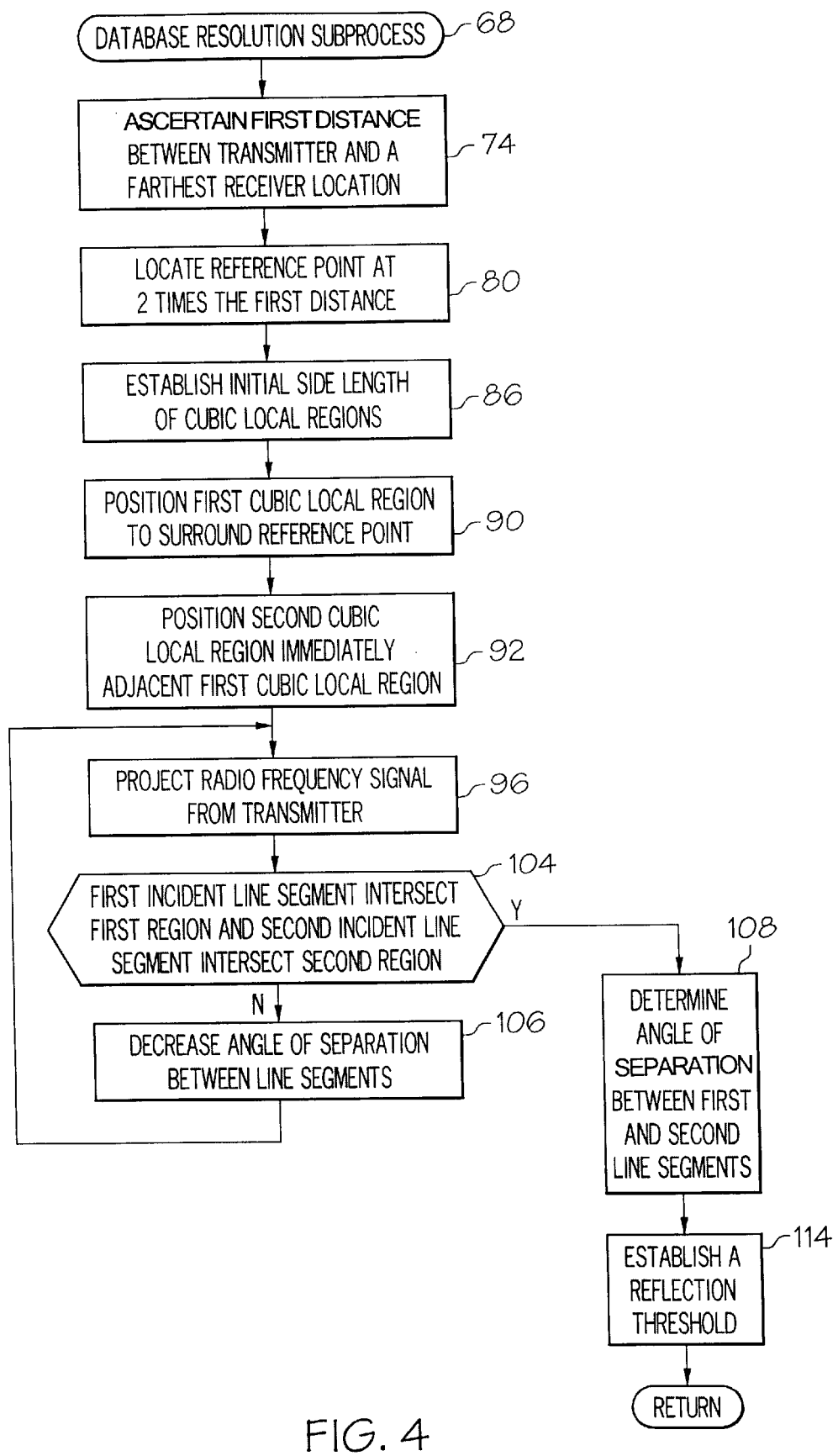
FIG. 4 shows a flow chart of a database resolution subprocess.
Figure 5:
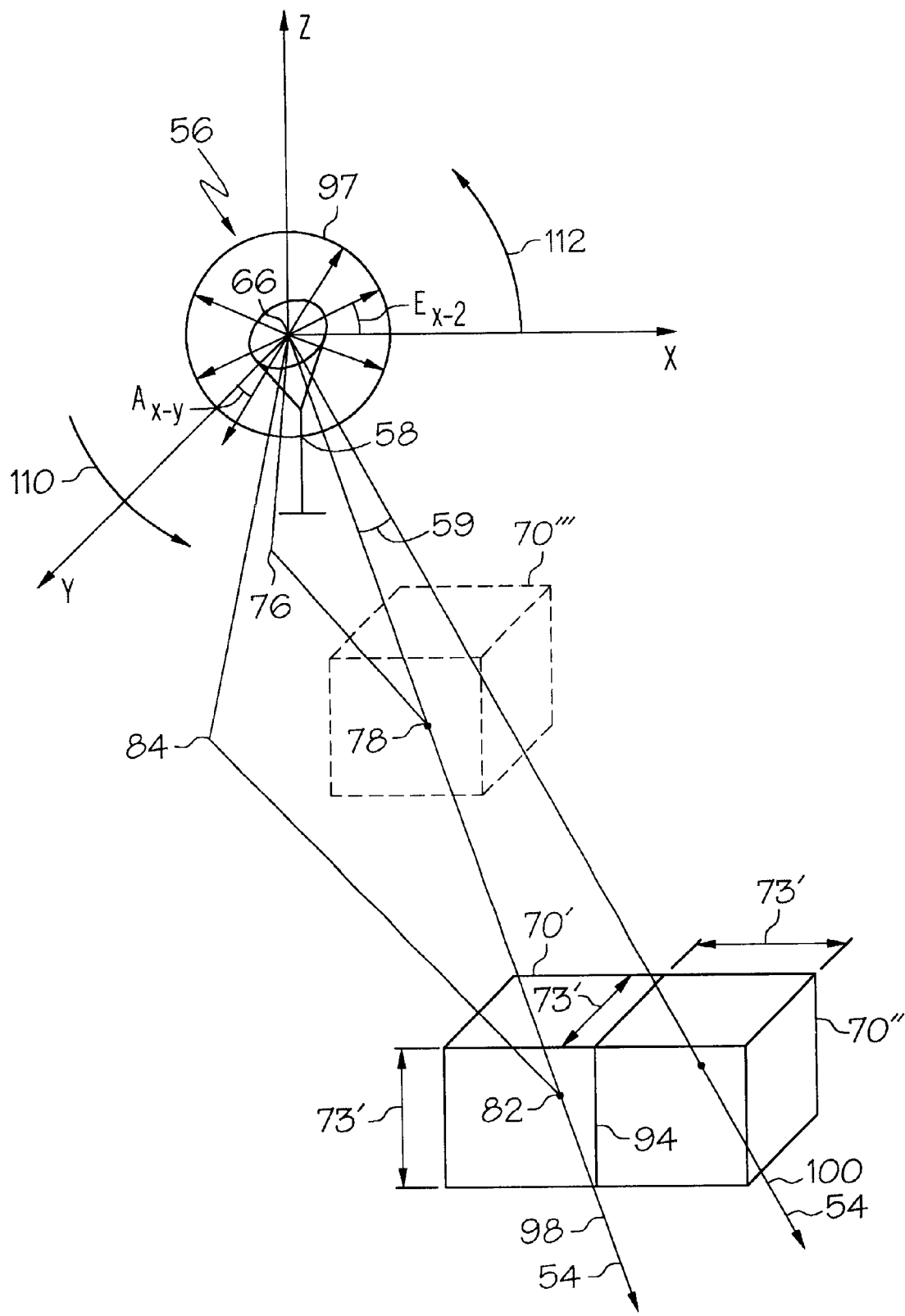
FIG. 5 shows a diagram of a pair of propagation paths of a transmitted radiofrequency signal projecting from the transmitter.

Referring to FIGS. 4–5, FIG. 4 shows a flow chart of database resolution subprocess 68 and FIG. 5 shows a diagram of a pair of propagation paths 54 of radiofrequency signal 56 projecting from transmitter 58. Subprocess 68 begins with a task 74. In task 74, processor 22 ascertains a first distance 76 between transmitter 58 and a farthest receiver location 78. Farthest receiver location 78 is a point in three-dimensional environment 52 (FIG. 3) at which a receiver (not shown) may be located farthest away from transmitter 58 positioned at transmitter location 66 (FIG. 1).

In response to task 74, a task 80 is performed. Task 80 causes processor 22 to locate a reference point 82 at a second distance 84 from transmitter 58. In a preferred embodiment, second distance 84 is approximately two times first distance 76.

Following task 80, a task 86 is performed by processor 22 (FIG. 1) to establish side length 46 of cubic local region 70 (FIG. 3). As discussed previously, cubic local region 70 is a predetermined sensing region surrounding receiver 72 (FIG. 3) through which some of propagation paths 54 desirably pass in order to characterize signal propagation at receiver 72. Through the setting of side length 46 in task 86, processor 22 (FIG. 1) serves as a size establisher for establishing a volume size for cubic local region 70. Side length 46 (FIG. 3) is established in response to the level of detail of terrain database 32 (FIG. 1) and the computation capability of system 20.

It may be assumed that all of propagation paths 54 that intersect cubic location region 70 affect receiver 72. If side length 46 is too long, too many propagation paths 54 may be detected and an inordinately large number of propagation paths 54 may be selected for subset 47 (FIG. 1). Conversely, if side length 46 is too short, an insufficient quantity or even a total absence of propagation paths 54 may be detected which again adversely affects subset 47. It has been found that cubic local region 70 having side length 46 of approximately ten meters, which is a typical street width, is adequate in an outdoor environment.

In association with task 86, tasks 90 and 92 are performed. Task 90 causes processor 22 to position a first cubic local region 70' to surround reference point 82. Likewise, in task 90, a second cubic local region 70" is positioned immediately adjacent first cubic local region 70'. In other words, first and second local regions 70' and 70" share a common side 94 and exhibit side length 46. Like cubic region 70 (FIG. 3), first and second cubic regions 70' and 70" described herein are volumes of space at a particular location and no physical structure is required to correspond to regions 70' and 70". Accordingly, positioning tasks 90 and 92 entail defining location coordinates for each corner of cubic regions 70' and 70".

Following tasks 90 and 92, a task 96 is performed. At task 96, radiofrequency signal 56 is projected from transmitter 58. Those skilled in the art will recognize that when a radiofrequency signal is transmitted from a transmitter, the radiofrequency signal is a wavefront, represented as a sphere 97 (FIG. 5). In a simulation environment, wavefront 97 is desirably subdivided into a number of incident propagation paths, or line segments, projecting from the transmitter and separated by others of the incident propagation paths by discrete intervals, namely angle of separation 59 (FIG. 3). At task 96, a first incident line segment 98 and a second incident line segment 100 project from transmitter 58 and are separated by angle of separation 59. At task 96, angle of separation 59 may be initially established in response to mathematical modeling, predictions, prior experience, and so forth.

Following task 96, subprocess 68 proceeds to a query task 104. At query task 104, processor 22 (FIG. 1) determines if first incident line segment 98 intersects first cubic region 70' and second incident line segment 100 intersects second cubic region 70". That is, query task 104 determines if at least one of propagation paths 54 intersects each adjacent cubic region 70 having side length 46 and being located at distance 84 that is approximately twice the distance of farthest receiver location 78.

When query task 104 determines that at least one of first and second incident line segments 98 and 100, respectively, does not intersect their respective cubic regions 70' and 70", subprocess 68 proceeds to task 106. At task 106, angle of separation 59 is decreased by a predetermined increment.

Subprocess 68 then loops back to task 96 to project radiofrequency signal 56 from transmitter 58 using the new angle of separation 59 and to determine in query task 104 if first and second incident line segment 98 and 100 now intersect their respective regions 70' and 70". Accordingly, tasks 96, 104, and 106 form an iterative process for determining angle of separation 59. At query task 104, when both first and second incident line segments 98 and 100 intersect their respective regions 70' and 70", subprocess 68 proceeds to a task 108.

At task 108, angle of separation 59 between first and second line segments 98 and 100 is determined through the iterative methodology of tasks 104 and 106. When angle of separation 59 is adjusted as described above, the quantity of propagation paths, intersecting a third cubic region 70''', shown in ghost form, surrounding farthest receiver location 78 will have the desired density of intersecting propagation paths 54. Angle of separation 59 will be utilized to separate all propagation paths 54 projecting from transmitter 58 about both an azimuth 110 and an elevation 112 measured from transmitter location 66.

Following task 108, a task 114 is performed. At task 114, reflection threshold 61 (FIG. 1) is established. Reflection threshold 61 is the maximum allowable quantity of reflections allowed for each of propagation paths 54. That is, following a certain number of times that a signal is reflected from reflective polygons 62 (FIG. 3), it is predicted that the remaining signal strength will be below a level worth considering.

After task 114, subprocess 68 exits having determined angle of separation 59 and reflection threshold 61, and program control returns to a task 116 of database formation process 34 (FIG. 2). Angle of separation 59 and reflection threshold 61 provide criteria for establishing the resolution of database 42. When angle of separation 59 is small, the resolution of database 42 is high, thus more accurate. Unfortunately, high database resolution is achieved at the cost of a greater computational costs and greater memory requirements. In contrast, when angle of separation 59 is larger, the resolution of database 42 is lower, thus potentially less accurate. However, savings in terms of computational costs and memory requirements are achieved. Accordingly, subprocess 68 is performed to desirably optimize the resolution of database 42 while limiting the computation time and size of database 42.

Referring back to FIGS. 2 and 3, task 116 causes processor 22 (FIG. 1) to project radiofrequency signal 56 from transmitter 58. In response to task 116, each of propagation paths 54 begins as an incident line segment 120 originating at transmitter location 66 and separated by others of incident line segments 120 by angle of separation 59 along azimuth 110 (FIG. 5) and elevation 112 (FIG. 5). If incident line segment 120 intersects one of reflective polygons 62, a reflection line segment 122 is created.

In addition to task 116, a task 124 causes processor 22 (FIG. 1) to set a reflection counter (not shown) to zero. The reflection counter will be utilized during the execution of process 34 to maintain a number of times one of propagation paths 54 reflects from reflective polygons 62 in three-dimensional environment 52 to form consecutive ones of reflection line segments 122.

Referring to FIG. 6 in connection with FIGS. 2–3, FIG. 6 shows a table of an exemplary propagation path database 42. Only a few of propagation paths 54 are forward-traced in exemplary database 42 for clarity of illustration. However, it should be readily apparent to those skilled in the art that propagation path database 42 will include many more propagation paths 54.

Database 42 includes transmitter ID 57, angle of separation 59, and reflection threshold 61. In this exemplary scenario, transmitter ID 57 is "T1", angle of separation 59 is "0.2", and reflection threshold is "3". Database 42 also includes a start location coordinates field 128 for identifying the beginning of one of incident line segments 120 or the beginning of one of reflection line segments 122 in a three-dimensional coordinate system $(x_s, y_s, z_s)$. A propagation direction field 130 describes the direction of propagation of one of incident line segments 120 or reflection line segments 122 in azimuth 110 and elevation 112. A distance field 132 maintains a cumulative path length 133 of propagation path 54 from transmitter 58, and an end location coordinates field 134 identifies the end of one of incident lines segments 120 or the end of one of reflection line segments 122 in the three-dimensional coordinate system $(x_e, y_e, z_e)$.

Following tasks 116 and 124 of process 34 (FIG. 2), a task 136 is performed to begin the formation of propagation path database 42 (FIG. 1) through a forward-tracing methodology. Task 136 causes processor 22 (FIG. 1) to store one of incident line segments 120 as an entry in propagation database 42. Database information 138 for a first one of propagation paths 54, labeled path "A" in both of FIGS. 3 and 6 for clarity of understanding, includes a first entry 140 for incident line segment 120 labeled "A1".

In response to task 136, a task 142 is performed. Task 142 causes processor 22 to associate first entry 140 for incident line segment 120 with transmitter location 66 and propagation direction. As shown in database 42, of FIG. 6, incident line segment 120, labeled A1, stored in database 42 as first entry 140, is associated with location coordinates $(x_o, y_o, z_o)$ for transmitter location 66 (FIG. 3) in start field 128, azimuth 110 (∠a), elevation 112 (∠b), and cumulative distance of the beginning of incident line segment (A1) 120 from transmitter 58 (0) in distance field 132.

Following task 142 of process 34, a query task 144 is performed. Query task 144 determines if an intersection is detected between the one of incident line segments 120 or the one of reflection line segments 122 that is currently being forward-traced with one of reflective polygons 62. When an intersection is detected at query task 144, process 34 proceeds to a task 146. Task 146 causes processor 22 to establish an end of the line segment at the intersection point.

Referring to three-dimensional environment 52 (FIG. 3) and database 42 (FIG. 6), incident line segment A1 intersects one of reflective polygons 62 at an intersection point 148. At task 146, end location coordinates $(x_1, y_1, z_1)$ for intersection point 148 are determined and stored in database 42 in end location coordinates field 134 of first entry 140 for incident line segment (A1) 120.

Following task 146, a task 150 is performed. Task 150 causes processor 22 to store the next line segment as the next database entry in database 42. With reference to database 42

(FIG. 6), end location coordinates $(x_1, y_1, z_1)$ for intersection point 148 define the end of incident line segment (A1) 120. In addition, end location coordinates $(x_1, y_1, z_1)$ define the beginning of reflection line segment (A2) 122. As such, task 150 results in a second entry 152 for reflection line segment (A2) 122.

In response to task 150, a task 154 is performed. In task 154, processor 22 (FIG. 1) associates the next line segment with intersection location and the propagation direction. As shown in database 42 (FIG. 6), reflection line segment (A2) 122, stored in database 42 as second entry 152, is associated with location coordinates $(x_1, y_1, z_1)$ for intersection point 148 (FIG. 3) in start field 128, azimuth 110 ($\angle c$), and elevation 112 ($\angle d$).

Following task 154, a task 156 is performed. In task 156, cumulative path length 133 is obtained. Cumulative path length 133 of path A between transmitter 58 and intersection point 148 is obtained and entered in distance field 132, labeled d1, of second entry 152 for reflection line segment A2.

Following task 156, a task 158 is performed. At task 158, the reflection counter is incremented by one. Thus, in continuing observation of database information 138 for path A, the reflection counter value of one indicates the reflection of propagation path A at intersection point 148.

Next, process 34 proceeds to a query task 160. At query task 160, processor 22 determines if the quantity in the reflection counter is equal to reflection threshold 61. When query task 160 determines that the quantity in the reflection counter is not equal to reflection threshold 61, as is the case for propagation path A, program control loops back query task 144 to continue forward-tracing propagation path A through the detection of an intersection of reflection line segment 122 with another one of reflective polygons 62.

At query task 144, when another intersection is not detected, the characterization of the selected one of propagation paths 54 is complete and program control proceeds to a query task 162. As shown in three-dimensional environment 52 (FIG. 3), another intersection is not detected for propagation path A when reflection line segment A2 intersects a boundary 164 of three-dimensional environment 52. In other words propagation path A propagates outside of three-dimensional environment 52 and is no longer of concern.

In another example, one of propagation paths, specifically path C, does not intersect any of reflective polygons 62. Rather, incident line segment 120, labeled C1 in database 42 (FIG. 6), is a straight-line path that intersects boundary 164. For each of such paths that intersect boundary 164, the end point of the line segment corresponds to the location coordinates at the intersection of the line segment with boundary 164. Accordingly, these location coordinates are entered in end location coordinates field 134 (FIG. 6) of database 42.

Referring back to process 34 (FIG. 2), at query task 160, when the quantity in the reflection counter is equal to reflection threshold 61, characterization of propagation path 54 is complete and program control also proceeds to query task 162.

By way of example, another one of propagation paths 54, labeled "H", is shown in environment 52. In addition, database 42 (FIG. 6) includes database information 166 for path H. Path H begins with incident line segment H1 originating at transmitter location $(x_o, y_o, z_o)$ and includes a number of consecutive reflection line segments 122. For example, incident line segment H1 intersects one of reflective polygons 62 at a first intersection point 168 having location coordinates $(x_{15}, y_{15}, z_{15})$. A first reflection line segment, H2, begins at first intersection point 168 and ends at a second intersection point 170 having location coordinates $(x_{16}, y_{16}, z_{16})$. A second reflection line segment, H3, begins at second intersection point 170 and ends at a third intersection point 172 having location coordinates $(x_{17}, y_{17}, z_{17})$, and a third reflection line segment, H4, begins at third intersection point and ends at a fourth intersection point 174 having location coordinates $(x_{18}, y_{18}, z_{18})$. Subsequent reflection line segments, H5 and H6, in environment 52 are not stored in database 42 (FIG. 6), since following the processing of third reflection line segment H4, query task 160 determined that the quantity in reflection counter does indeed equal reflection threshold 61.

As such, when query task 144 is negative or when query task 160 is affirmative, query task 162 is performed to determine if another one of incident line segments 120, originating at transmitter location 66, is to be forward-traced. When there is another one of incident line segments 120 at query task 162, process 34 loops back to task 124 to set the reflection counter back to zero, and to characterize the next one of incident line segments 120, and any subsequent reflection line segments 122 for another one of propagation paths 54.

However, when query task 162 determines that there is not another one of incident line segments, the characterization of propagation paths 54 originating at transmitter location 66 is complete, and process 34 proceeds to a task 176. At task 176, processor 22 ceases the projection of radiofrequency signal 54 in three-dimensional environment 52. Following task 176, process 34 exits.

The outcome of process 34 is database 42 of the geometric properties of propagation paths 54 originating from a specific transmitter 58 and projected along both azimuth 110 and elevation 112 from transmitter location 66. Database 42 is limited in resolution, hence size, by angle of separation 59 between adjacent ones of propagation paths and by reflection threshold 61. In addition, following the formation of database 42, multipath effects of radiofrequency signal 56 originating from transmitter 58 can be found for a receiver located anywhere in three-dimensional environment without the need for further access to terrain database 32 (FIG. 1).

Those skilled in the art will recognize that database 42 may also be limited in size by refraining from characterizing those propagation paths 54 that are not likely to propagate toward a potential location of a receiver in three-dimensional environment. Some examples of such propagation paths 54 include those paths 54 that propagate directly overhead or directly downward from transmitter location 66.

Figure 7:
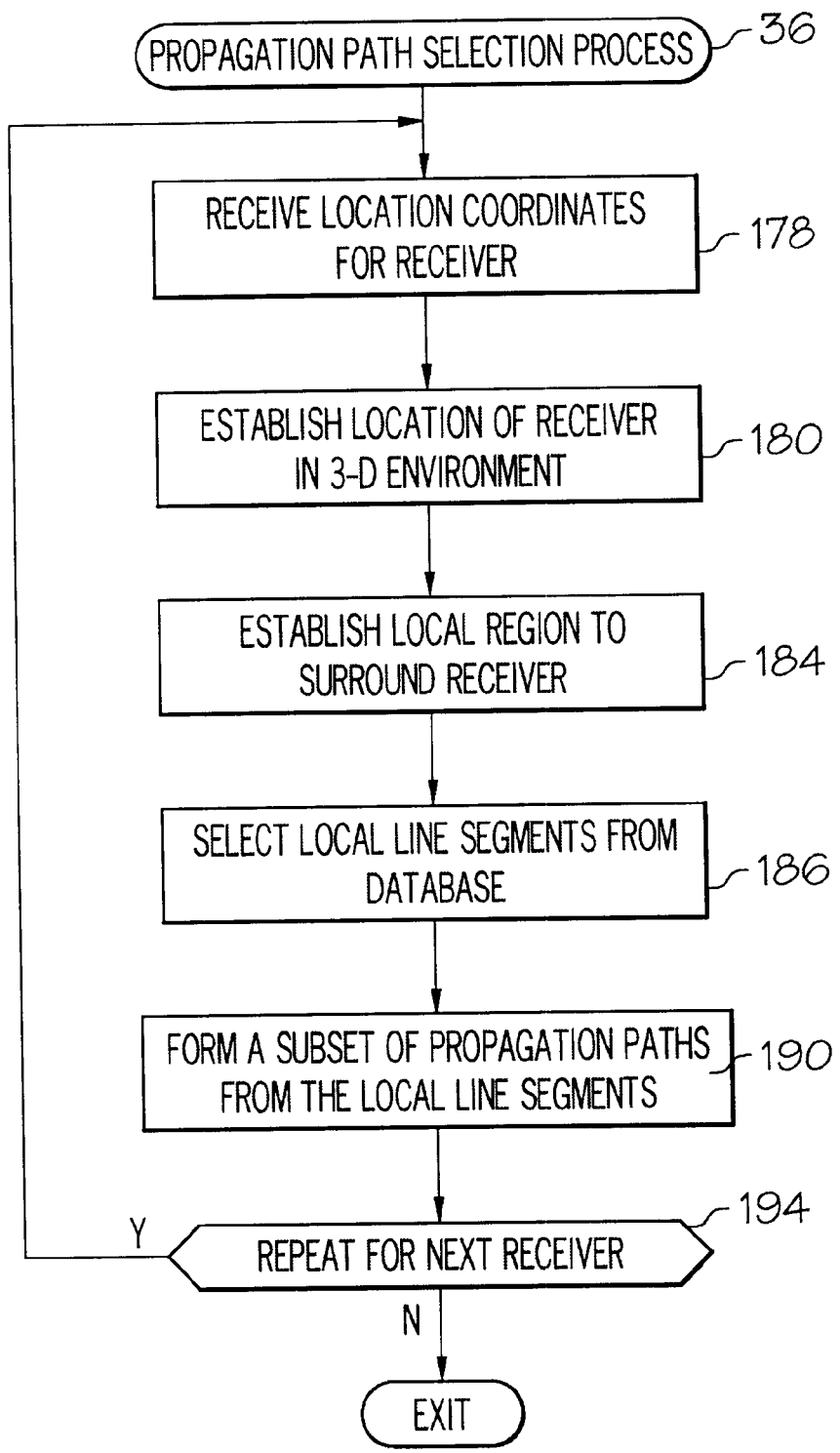
FIG. 7 shows a flow chart of a propagation path selection process.

FIG. 7 shows a flow chart of propagation path selection process 36. Process 36 is executed by processor 22 (FIG. 1) to identify ones of propagation paths 54 (FIG. 3) of radiofrequency signal 56 (FIG. 3) that arrive from transmitter 58 (FIG. 3) to the proximity of receiver 72 (FIG. 3). In other words, process 36 selects the multipath components of radiofrequency signal 56.

Process 36 is readily performed for radiofrequency signal 56 projecting from transmitter 58 at transmitter location 66 and arriving at any receiver location within three-dimensional environment 52 (FIG. 3) through the utilization of previously created propagation path database 42 (FIG. 6). In addition, process 36 can be executed by processor 22 immediately following the formation of database 42, at a later time and date, or even on another computer system to which database 42 has been downloaded.

Process 36 begins with a task 178. Upon initiation of process 36, task 178 is performed to receive location coordinates 44 (FIG. 1) for receiver 72 (FIG. 3). Receiver location coordinates 44 may be received through user input at a location coordinates receiver element, such as input device 24 (FIG. 1). Receiver location coordinates represent an actual location of receiver 72 in the actual area of interest which is being represented by three-dimensional environment 52. Alternatively, processor 22 may serve as the location coordinates receiver element by selecting receiver location coordinates 44 in response to an antenna location optimization routine (not shown).

Once received, processor 22 may temporarily store receiver location coordinates 44 in memory 28 (FIG. 1) of system 20 (FIG. 1). Although receiver location coordinates 44 are represented in a three-dimensional coordinate system (i.e., $x_r$, $y_r$, $z_r$), it should be understood that a user may enter an address, latitude and longitude, or any comparable location identifiers that can be subsequently rendered into three-dimensional coordinates $x_r$, $y_r$, and $z_r$.

Following task 178, a task 180 is performed. At task 180, processor 22 (FIG. 2) utilizes receiver location coordinates 44 to establish a receiver location 182 (see FIG. 3) in three-dimensional environment 52 (FIG. 3). Three-dimensional environment 52 may be subsequently displayed on display 26 (FIG. 1) along with transmitter location 66 and receiver location 182.

Following task 180, a task 184 is executed by processor 22. At task 184, cubic local region 70 (FIG. 3) is established to surround receiver 72. Location coordinates (not shown) for each corner of cubic local region 70 are identified and may be stored in association with local region side length 46 (FIG. 1) in memory 28 (FIG. 1).

In a preferred embodiment, cubic local region 70 is established having local region side length 46 (FIG. 3), determined in connection with database resolution subprocess 68 (FIG. 4), and is approximately centered at receiver location 182 (FIG. 3). Alternatively, local region side length 46 may be further adjusted in response to receiver location 182. For example, if receiver location 182 is very close to transmitter location 66, is may be desirable to decrease common side length 46.

Figure 8:
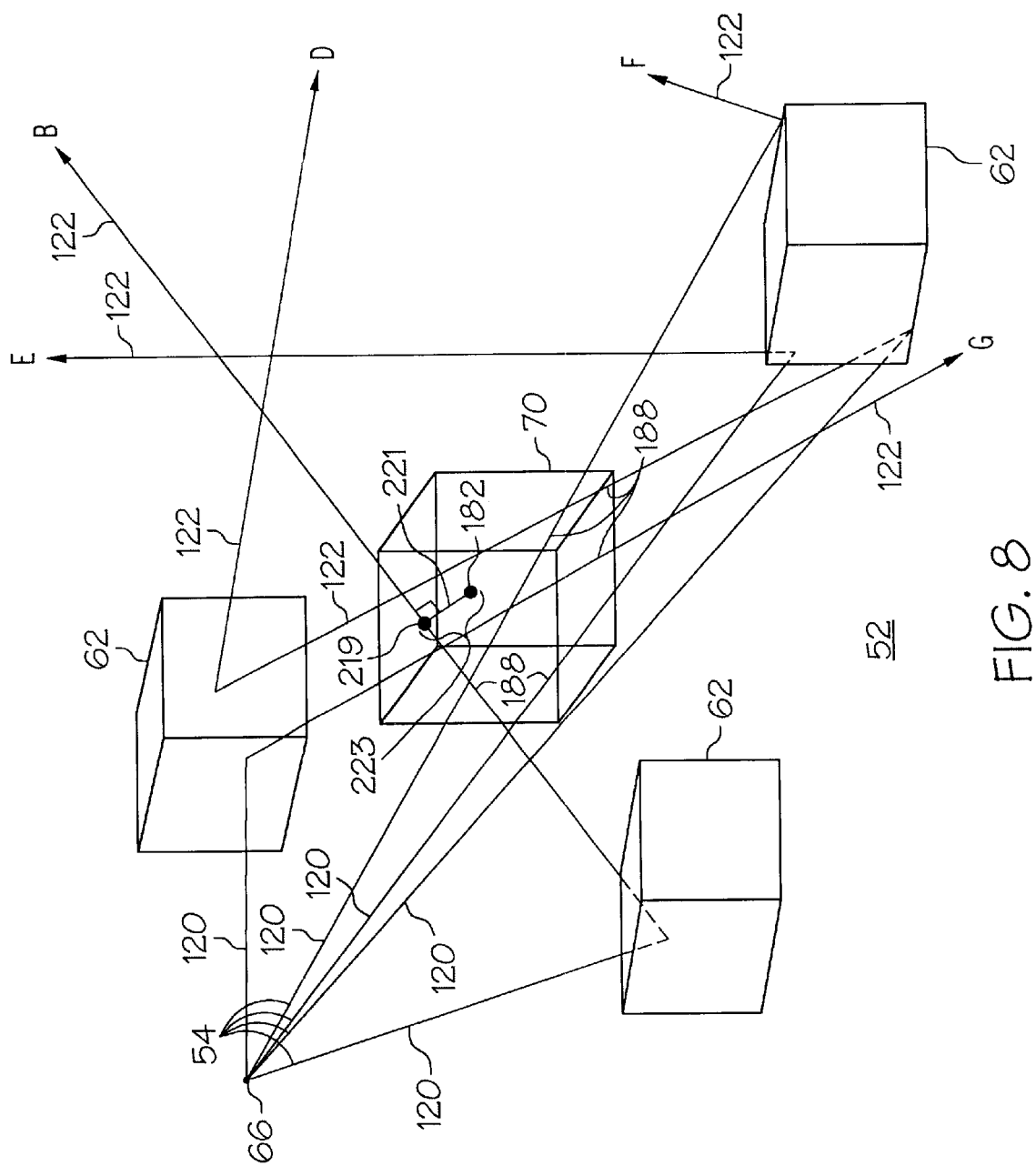
FIG. 8 shows an enlarged partial view of the three-dimensional environment of FIG. 3 with local line segments intersecting a cubic local region surrounding a receiver.

In response to task 184, a task 186 is performed by processor 22 to select local line segments from database 42. That is, through the execution of task 186, processor 22 serves as a segment selector element for selecting local line segments in response to receiver location 182. FIG. 8 shows an enlarged partial view of three-dimensional environment 52 of FIG. 3 with local line segments 188 intersecting cubic local region 70. By executing task 186, processor 22 detects those of incident line segments 120 and reflection line segments 122 of propagation paths 54 that intersect cubic local region 70. The detected incident line segments 120 and reflection line segments 122 are subsequently selected as local line segments 188.

Referring back to process 36 (FIG. 7), a task 190 is performed in combination with task 186. Task 190 causes processor 22 (FIG. 1) to form subset 47 of propagation paths 54 in response to local line segments 188 selected in task 186. FIG. 9 shows a table 192 of an exemplary subset 47 of propagation paths 54, that is, multipath components 193. Subset 47 is that portion of propagation paths 54 from database 42 (FIG. 6) each of which include one of local line segments 188. Accordingly, for clarity of illustration, subset 47 is a compilation of propagation paths 54, labeled B, D, E, F, and G, from FIG. 8. Multipath components 193 are the result of the propagation phenomena in which radiofrequency signal 56 arrives at receiver location 182 by more than one path.

Following the formation of subset 47 for receiver location 182 in task 190 of process 36 (FIG. 7), program control proceeds to a query task 194. Processor 22 performs query task 194 to determine if process 36 is to be repeated for another receiver, for example a second receiver 196 (see FIG. 3). Processor 22 may determine that process 36 is to be repeated by accessing location coordinates (not shown) for second receiver 196 stored in memory 28. Alternatively, a question may be posed to a user through display 26 (FIG. 1) who subsequently responds with location coordinates for second receiver 196.

In either case, when query task 196 determines that process 36 is to be repeated, program control loops back to task 178 to receive location coordinates for second receiver 196 and to select local line segments and form a subset of propagation paths specific to second receiver 196. Thus, process 36 can be performed for a radiofrequency signal transmitted from transmitter location 66 (FIG. 3) to any of a number of receivers in three-dimensional environment 52 (FIG. 3) through the utilization of propagation path database 42 (FIG. 6).

When query task 194 determines that process 36 is not to be repeated for another receiver, process 36 exits. The outcome of process 36 is subset 47 of the geometric properties of propagation paths 54, i.e. multipath components 193, originating from a specific transmitter and arriving proximate a selected receiver location.

Figure 10:
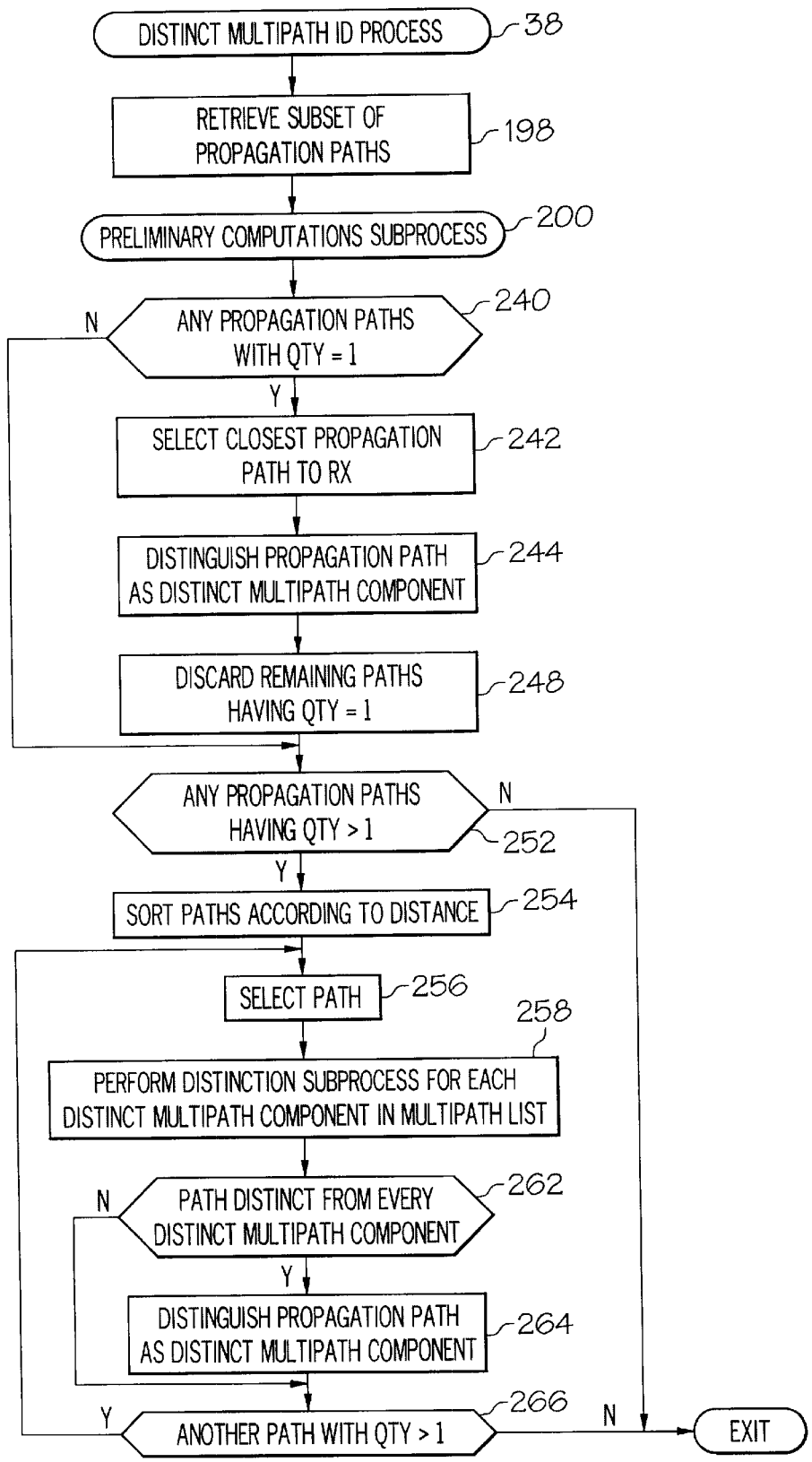
FIG. 10 shows a flow chart of a distinct multipath identification (ID) process.

FIG. 10 shows a flow chart of distinct multipath identification (ID) process 38. Through the execution of process 38, processor 22 (FIG. 1) serves as a multipath identifier element for identifying ones of multipath components 193 that are distinct multipath components. In other words, process 38 identifies those propagation paths 54 from subset 47 that represent unique wavefronts of radiofrequency signal 56.

Distinct multipath identification process 38 is readily performed for those propagation paths 54 of subset 47 selected through the execution of propagation path selection process 36 (FIG. 7). In addition, process 38 can be executed by processor 22 immediately following process 36, at a later time and date, or even on another computer system to which subset 47 is downloaded.

Process 38 begins with a task 198. Task 198 causes processor 22 (FIG. 1) to retrieve subset 47 from memory 28 (FIG. 1). Subset 47 is retrieved so that distinct multipath identification process 38 may be initiated.

Following task 198, a preliminary computations subprocess 200 is performed to groom each of propagation paths 54 of subset 47 prior to further analysis.

Figure 11:
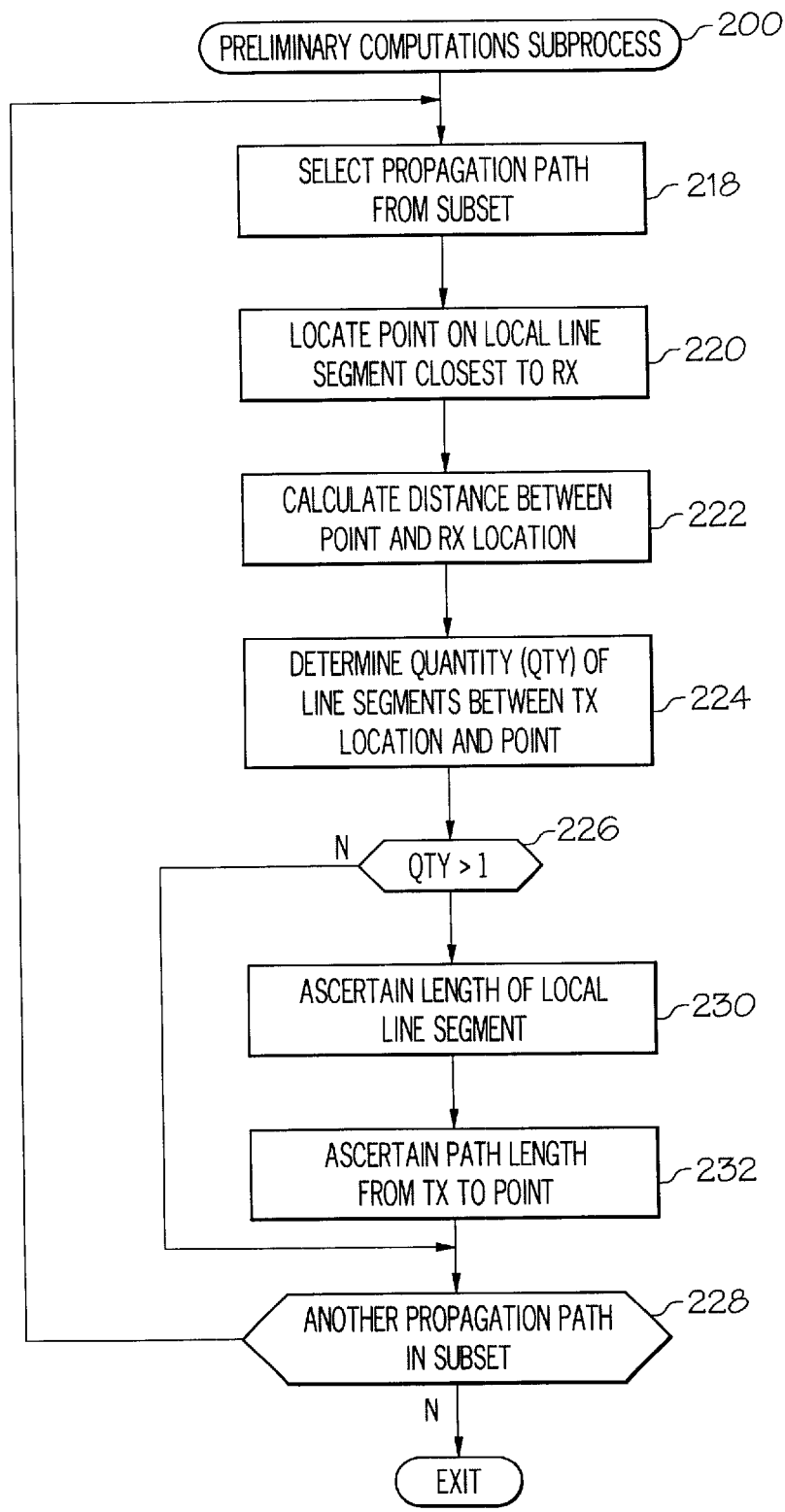
FIG. 11 shows a flow chart of a preliminary computations subprocess.

Referring to FIGS. 11 and 12, FIG. 11 shows a flow chart of preliminary computations subprocess 200, and FIG. 12 shows a table 202 of exemplary multipath components 193. Table 202 includes the associated results of the computations performed by the execution of subprocess 200, which will be described in detail below. For example, table 202 includes a path field 204 identifying one of multipath components 193 and a local line segment field 206 identifying one of local line segments 188 for each of multipath components 193 in path field 204. Table 202 also includes a closest point coordinates ($x_c$, $y_c$, $z_c$) field 208, a distance to receiver (RX) field 210, a quantity of line segments field 212, a segment length field 214, and a path length field 216.

Subprocess 200 begins with a task 218. Task 218 causes processor 22 to select one of multipath components 193 of subset 47 (FIG. 9).

Following task 218, a task 220 is performed for the one of multipath components 193 selected from subset 47 in task 218. Task 220 causes processor 22 (FIG. 1) to locate a point on local line segment 188 (FIG. 9) for the selected one of multipath components 193 that is closest to receiver location 182 (FIG. 3). Referring momentarily to FIG. 8, a closest point 219 on local line segment 188 of path B is shown in enlarged environment 52. The calculated closest point 219 is subsequently entered into closest point coordinates field 208 of table 202 in association with the selected one of multipath components 193.

To locate closest point $(x_c, y_c, z_c)$ 219, it is known that a line 221 (FIG. 8) between closest point 219 on local line segment 188 and receiver location 182, described by receiver location coordinates $(x_r, y_r, z_r)$ 44, will be perpendicular to local line segment 188. Accordingly, closest point $(x_c, y_c, z_c)$ 219 can be located as follows:

The vector along local line segment 188 is:

$(x_s-x_e)$, $(y_s-y_e)$, $(z_s-z_e)$

The vector perpendicular to local line segment 188 is:

$(x_c-x_r)$, $(y_c-y_r)$, $(z_c-z_r)$

The dot product is as follows:

$$(x_s-x_e)(x_c-x_r)+(y_s-y_e)(y_c-y_r)+(z_s-z_e)(z_c-z_r)=0$$

Since $x_c$, $y_c$, and $z_c$ are located on local line segment 188, then:

$$\frac{(x_c - x_s)}{(x_e - x_s)} = \frac{(y_c - y_s)}{(y_e - y_s)} = \frac{(z_c - z_s)}{(z_e - z_s)}$$

Define:

$dx = x_e - x_s$; length of local line segment 188 along x
$dy = y_e - y_s$; length of local line segment 188 along y
$dz = z_e - z_s$; length of local line segment 188 along z
Then, solving for $x_c$ yields:

$$x_c = \frac{(y_c - y_s)dx}{dy} + x_s$$

Solving for $z_c$ yields:

$$z_c = \frac{(y_c - y_s)dz}{dy} + z_s$$

Substituting the above equations into the dot product to solve for $y_c$ yields:

$$(x_s - x_e)\left[\left(\frac{(y_c - y_s)dx}{dy} + x_s\right) - x_r\right] +$$
$$(y_s - y_e)(y_c - y_r) + (z_s - z_e)\left[\left(\frac{(y_c - y_s)dz}{dy} + z_s\right) - z_r\right] = 0$$

Thus, the coordinates $x_c$, $y_c$, $z_c$ for closest point 219 on local line segment 188 are as follows:

$$y_c = y_s + dy((dy^2 + dz^2)x_s)$$
$$x_c = \frac{\{[y_s + dy((dy^2 + dz^2)x_s)] - y_s\}dx}{dy} + x_s$$

$$z_c = \frac{\{[y_s + dy((dy^2 + dz^2)x_s)] - y_s\}dz}{dy} + z_s$$

Following the location of closest point 219 on local line segment 188 to receiver location 182 in task 220, subprocess 200 proceeds to a task 222. At task 222, the length of line 221 (FIG. 8) is calculated to obtain a distance $(d_{cr})$ 223 between closest point $(x_c, y_c, z_c)$ 219 and receiver location 182.

Distance $(d_{cr})$ 223 is found as follows:

$$d_{cr} = \sqrt{(x_r - x_c)^2 + (y_r - y_c)^2 + (z_r - z_c)^2}$$

The calculated distance $(d_{cr})$ 223 is subsequently entered into distance to receiver (RX) field 210 in association with the selected one multipath components 193.

Following task 222, a task 224 determines a quantity 225 of incident line segments 120 and reflection line segments 188 of the selected one of multipath components 193 from transmitter location 66 to the closest point located in task 220. Task 224 is readily performed by referencing table 192 (FIG. 9), and simply determining the quantity of line segments 120 and 122 up to and including local line segment 188 that form the selected one of multipath components 193. For example, path B shown in table 192 (FIG. 9) is formed from one (B1) of incident line segments 120 and one (B2) of reflection line segments 122. Thus, quantity 225 for path B is "2". Quantity of line segments 225 is subsequently entered into quantity of line segments field 212 of table 202 in association with the selected on of multipath components 193.

Following task 224, a query task 226 is performed. Query task 226 determines if quantity 225 in line segment field 212 is greater than one for the selected multipath component 193. When quantity 225 not greater than one, subprocess proceeds to a query task 228 (discussed below). However, when quantity 225 is greater than one, subprocess 200 proceeds to a task 230.

Task 230 causes processor 22 (FIG. 1) to ascertain a length 231 of local line segment 188 from its start location $(x_s, y_s, z_s)$ in start location coordinates field 128 of table 192 (FIG. 9) to its closest point $(x_c, y_c, z_c)$ 219 in closest point coordinates field 208 (FIG. 12) of table 202. Since start location $(x_s, y_s, z_s)$, closest point $(x_c, y_c, z_c)$ 219, receiver location $(x_r, y_r, z_r)$ 182, and distance $(d_{cr})$ 223 between closest point 219 and receiver location 182 (FIG. 8) are known, local line segment $(l_{seg})$ length 231 can be readily approximated by solving for the equations of a right triangle having a first side equal to distance 223, a second side equal to local line segment length 231, and a vector along the hypotenuse being $(x_s-x_c)$, $(y_s-y_c)$, $(z_s-z_c)$. The calculated local line segment length $(l_{seg})$ 231 is subsequently entered into segment length field 214 of table 202.

Following task 230, a task 232 is performed. Task 232 causes processor 22 (FIG. 1) to ascertain a path length 233 of the selected one of multipath components 193 from transmitter location 66 (FIG. 3) to the closest point determined in task 220.

Path length 233 may be readily approximated by referencing distance to transmitter field 132 (FIG. 9) of table 192 (FIG. 9) to obtain cumulative path length 133 of the selected one of multipath components 193 from transmitter location 66 (FIG. 3) to the start location of local line segment 188, identified in start location coordinates field 128 (FIG. 9). Local line segment length $(l_{seg})$ 231 entered in field 214 (FIG. 12) is added to cumulative path length 133 in field 128 to obtain path length 233. Path length ($l_{path}$) 233 is subsequently entered into path length field 216 of table 202.

The preceding calculation for approximating path length ($l_{path}$) 233 is effective when the resolution of database 42 (FIG. 6) is high, for example, when angle of separation 59 (FIG. 3) is less than one degree. As discussed previously, the resolution of database 42 is affected by angle of separation 59 (FIG. 3), or the angle separating each of incident line segments 120 (FIG. 3) transmitted from transmitter location 66 (FIG. 3). In other words, as angle of separation 59 increases, the resolution of database 42 (FIG. 6), thus accuracy, decreases. Of course, it should also be readily apparent that as angle of separation 59 increases, the size of database 42 and computational activities associated with the formation of database 42 decreases.

When angle of separation 59 is greater than approximately one degree, the above calculation of path length 233 may incur error due to the lower resolution of database 42. Accordingly, it has been discovered that a more accurate approximation of path length 233 between transmitter location 66 and receiver location 182 (FIG. 3) is achieved by adjusting path length 233 to an adjusted path length equivalent to the hypotenuse of a right triangle, the sides of which are distance 223, $d_{cr}$, in distance field 210 of table 202, and path length ($l_{path}$) 233 as calculated above. Since path length ($l_{path}$) 233 is at a right angle to the vector, i.e., line 221 (FIG. 8), defining distance 223 from closest point ($x_c$, $y_c$, $z_c$) 219 on local line segment 188 to receiver 72, the Pythagorean theorem may be employed to solve for the hypotenuse to obtain an adjusted path length as follows:

$$l_{path}(adjusted) = \sqrt{(d_{cr}^2 + l_{path}^2)}$$

This calculated hypotenuse, $l_{path}$(adjusted), replaces path length ($l_{path}$) 233 in path length field 216 of table 202. Accordingly, although an additional calculation may be performed at task 232 to obtain $l_{path}$(adjusted), this methodology may be employed for propagation path databases of lower resolution, i.e., greater angles of separation, to arrive at satisfactory approximations of path length 233, while gaining calculation and memory savings during the formation of lower resolution databases in response to the execution of database formation process 34 (FIG. 2).

Following task 232, subprocess 200 proceeds to query task 228. Likewise, as discussed above, when query task 226 determines that the quantity of line segments 225 is not greater than one, subprocess 200 proceeds to query task 228. Query task 228 determines if there is another one of multipath components 193 for which the above described calculations are to be performed. When there is another one of multipath components 193, program control loops back to task 218 and the computations of subprocess 200 are performed for the next one of multipath components 193.

However, when query task 228 determines that there is not another one of multipath components 193, subprocess 200 exits. The outcome of subprocess 200 is data, illustrated in table 202 (FIG. 12), that will be utilized for identifying distinct multipath components of radiofrequency signal 56 (FIG. 3).

Referring back to distinct multipath identification process 38 (FIG. 10) in connection with table 202 (FIG. 12), after subprocess 200 exits, program control returns to process 38 at a query task 240. Query task 240 causes processor 22 (FIG. 1) to determine if there are any multipath components 193 for which quantity of line segments 225 entered in quantity of line segments field 212 of table 202 (FIG. 12) is equivalent to one. In other words, query task 240 determines if a portion of multipath components 193 represents straight-line paths from transmitter 58 (FIG. 3) to the proximity of receiver 72 (FIG. 3). If such is the case, the local line segment 188 for each of these straight-line paths will be its corresponding incident line segment 120.

When processor 22 determines at query task 240 that there is one or more of propagation paths having quantity 225 of line segments equivalent to one, identification process 38 proceeds to a task 242.

At task 242, processor 22 simply selects the one of multipath components 193 that is closest to receiver location 182. For example, in table 202, a portion 243 of multipath components 193, specifically paths E and F, each present quantity 225 of "1" in their corresponding quantity of line segments field 212. From distance to receiver field 210, distance 223 between local line segment 188 of path E and receiver location 182 (FIG. 3) is $d_{Er}$. Likewise, distance 23 between local line segment 188 of path F and receiver location 182 (FIG. 3) is $d_{Fr}$. Suppose, for purposes of illustration that $d_{Fr}$ is less than $d_{Er}$, then path F is selected at task 242.

In response to task 242, a task 244 distinguishes the selected multipath component 193, in this example path F, as one of distinct multipath components 246 in table 202.

A task 248 is performed in connection with task 244. In task 248, processor 22 (FIG. 1) discards the remaining ones of multipath components 193 having quantity 225 equal to one. Again in the example cited above, since path F is distinguished as one of distinct multipath components 246, path E is discarded in task 244, as shown by shading 250 in table 202.

Accordingly, tasks 242, 244, and 248 select only one of multipath components 193 that have experienced no reflections between the transmitter and the receiver and remove the remaining straight-line multipath components 193 from further consideration. Such selection criteria for multipath components 193 represents a significant savings of calculation time when determining distinct multipath components 246. Such savings of calculation time is especially realized when receiver location 182 (FIG. 3) is close enough to transmitter 58 (FIG. 3) that few reflections of radiofrequency signal 56 (FIG. 3) occur.

Following task 248, a query task 252 is performed. Alternatively, when query task 240 determines that there are no multipath components 193 having quantity 225 in line segments field 212 equivalent to one, process 38 proceeds to query task 252. Query task 252 determines from quantity of line segments field 212, if there are any of multipath components 193 having quantity 225 greater than one.

When query task 252 determines that there are no multipath components 193 having quantity 225 in line segment field 212 greater than one, process 38 exits with all distinct multipath components 246 distinguished. The response to query task 252 is typically affirmative unless propagation paths 54 (FIG. 3) of radiofrequency signal 56 (FIG. 3) experience no reflections, such as when receiver location 182 (FIG. 3) is very close to transmitter location 66 (FIG. 3) or when there is little building or terrain clutter in three-dimensional environment 52 (FIG. 3).

Accordingly, when query task 252 determines that there are a portion of multipath components 193 having quantity 225 greater then one, process 38 proceeds to a task 254. Task 254 causes process 22 (FIG. 1) to sort multipath components 193 having quantity 225 greater than one according to distance 223 to receiver 72 in distance to receiver field 210. For clarity of illustration, paths B, D, and G of table 202 form a portion 255 of multipath components having quantity 225 greater than one and have been sorted in numbered order as shown in parentheses in distance field 210. As such, distance 223, $D_{Gr}$, for path G is less than distance 223, $D_{Br}$, for path B. Likewise, distance 223, $D_{Br}$, is less than distance 223, $D_{Dr}$, for path D.

Following task 254, a task 256 is performed. Task 256 causes processor 22 (FIG. 1) to select one of multipath components 193 of portion 255 in response to sorting task 254. In a preferred embodiment, processor 22 selects the closest one of multipath components 193 of portion 255 to receiver location 182. As discussed above, the closest one of multipath components 193 of portion 255 is path G as represented by having the shortest distance 223. Thus, at task 256 in this exemplary scenario, path G is selected.

Following task 256, a task 258 is performed. Task 258 causes processor 22 to perform a distinction subprocess 260 (see FIG. 13) for each distinct multipath component 246. Thus, task 258 causes processor 22 to compare the selected multipath component 193, i.e., path G, to every distinct multipath component 246 previously distinguished in table 202 (FIG. 12). The outcome of distinction subprocess 260 will be a determination of whether or not the selected multipath component 193 (path G) is distinct from each distinct multipath component 246 currently distinguished in table 202. Distinction subprocess 260 will be described in detail below.

Following task 258 and the execution of distinction subprocess 260 for the selected multipath component 193, program control proceeds to a query task 262. At query task 262, processor 22 reviews the outcome of distinction subprocess 260 to determine if the selected one of multipath components 193 (path G in this example) is distinct from every distinct multipath component 246 in table 202.

When the selected one of multipath components is distinct, process 38 proceeds to a task 264. Task 264 causes processor 22 to distinguish the selected one of multipath components 193, in this example path G, as distinct multipath component 246.

Following task 264, a query task 266 is performed. Alternatively, when query task 262 determines that the selected one of multipath components 193 is not distinct from each distinct multipath component 246, process 38 proceeds to query task 266. Query task 266 determines if there is another one of multipath components 193 in portion 255. When there is another one of multipath components 193, process 38 loops back to task 256 to select another one of propagation paths 54 and repeat distinction subprocess 260 in response to task 256.

Again citing the example shown in table 202 (FIG. 12), at query task 266, paths B and D of portion 255 remain for analysis. Accordingly, in response to an affirmative at query task 266, process 38 loops back to task 256 to select path B and distinction subprocess 200 is repeated for path B. Thus, each of multipath components 193 of subset 47 (FIG. 9) that includes one or more reflection line segments 120 (FIG. 8) is analyzed for distinctness.

When query task 266 determines that there is not another one of multipath components 193 of portion 255, process 38 exits with all distinct multipath components 246 distinguished. In other words, all of multipath components 193 that represent distinct wavefronts of radiofrequency signal 56 (FIG. 3) are identified.

Figure 13:
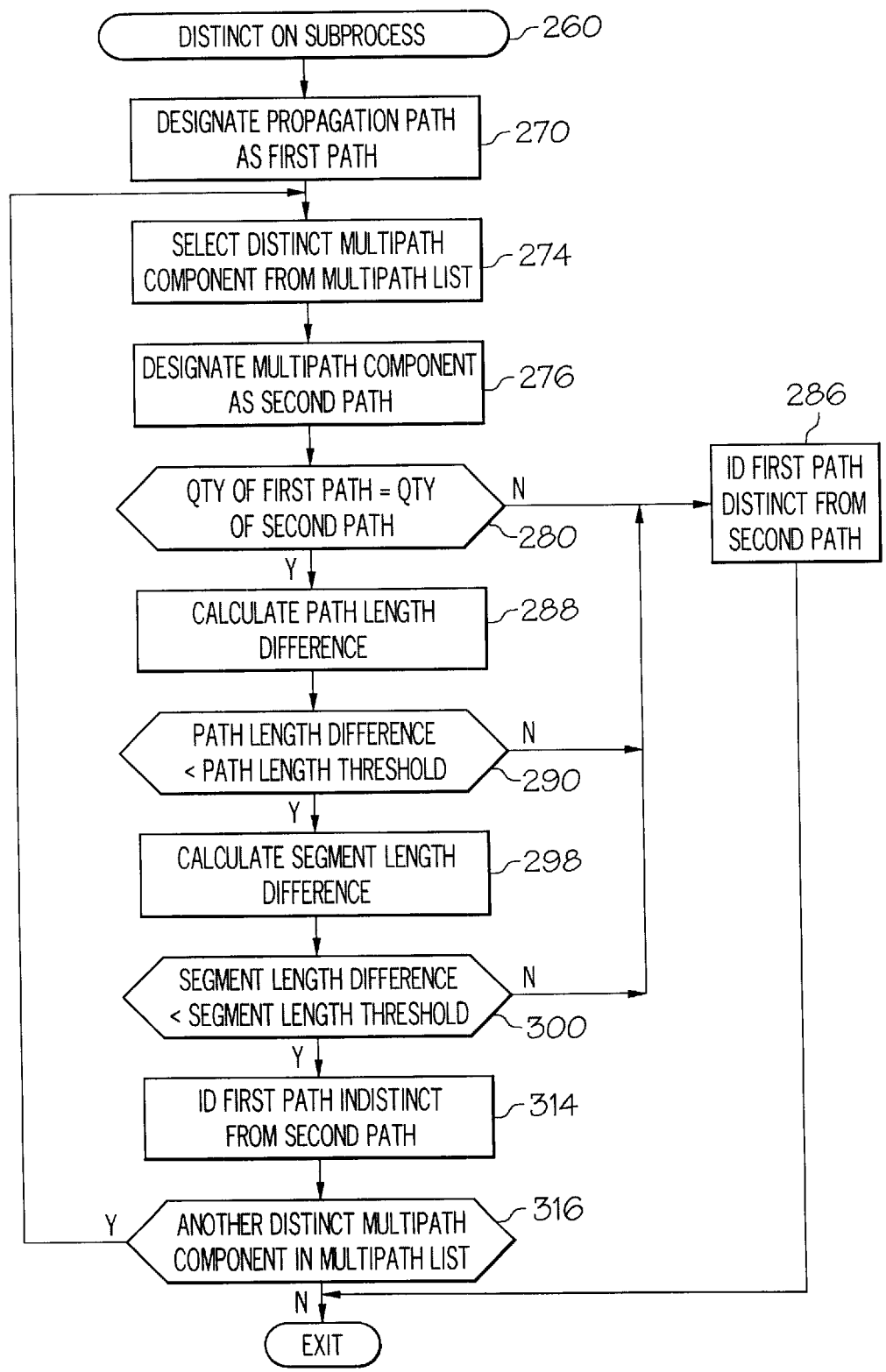
FIG. 13 shows a flow chart of a multipath distinction subprocess.

FIG. 13 shows a flow chart of multipath distinction subprocess 260. As discussed above, distinction subprocess 260 is performed to compare the one of multipath components 193 selected in task 256 (FIG. 10) of process 38 with each one of distinct multipath components 246 previously distinguished in table 202 (FIG. 12). The outcome of distinction subprocess 260 will be a determination of whether or not the selected multi-path component 193 can be distinguished as one of distinct multipath components 246 in table 202.

Subprocess 260 begins with a task 270. At task 270, processor 22 (FIG. 1) temporarily designates the multipath component 193 selected in task 256 as a first path. For example, path G of table 202 (FIG. 12) may be temporarily designated as a first path 272.

Following task 270, a task 274 is performed. At task 274, processor 22 selects one of distinct multipath components 246 from table 202. In this simplified scenario, processor 22 selects path F of table 202, which was previously distinguished as one of distinct multipath components 246.

A task 276 is performed in connection with task 274. Task 276 causes processor 22 to temporarily designate the selected one of distinct multipath components 246 as a second path. For example, path F of table 202 may be temporarily designated as a second path 278.

Following task 276, a query task 280 is performed. Query task 280 causes processor 22 to determine if quantity 225 in line segments field 212 (FIG. 12) of table 202 for first path 272 is equal to a quantity 225 in line segments field 212 for second path 278. When quantity 225 for first path 272 is unequal to quantity 225 for second path 278, first and second paths 272 and 278 represent distinct wavefronts of radiofrequency signal 56 (FIG. 3).

Figure 14:
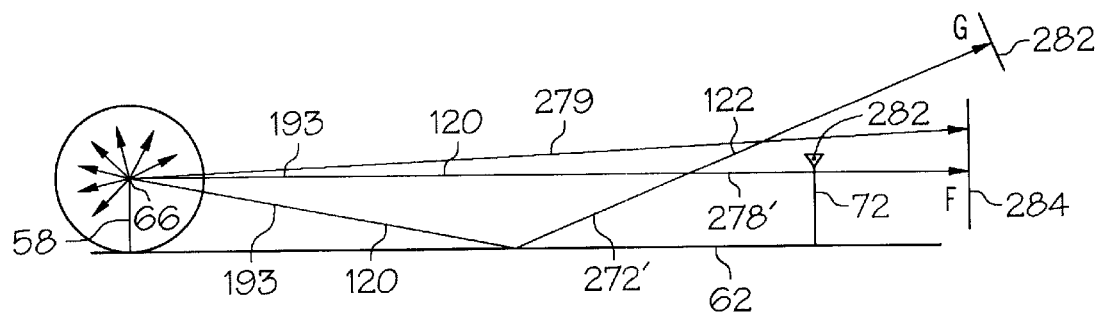
FIG. 14 shows a diagram of exemplary multipath components exhibiting an unequal quantity of line segments.

FIG. 14 shows a diagram of exemplary propagation paths 54 having an unequal quantity of line segments. In this exemplary scenario, a first path 272' includes incident line segment 120 and reflection line segment 122, indicating first path 272'includes a reflection from one of reflective polygons 62. Whereas, a second path 278' includes only incident line segment 120. Accordingly, a first wavefront 282 of radiofrequency signal 56 (FIG. 3) propagating along first path 272' is distinct from a second wavefront 284 of radiofrequency signal 56 (FIG. 3) propagating along second path 278'.

By way of contrast, a third path 279 is shown having quantity 225 equal to second path 278' and also representing second wavefront 284. Accordingly, third path 279 is indistinct from second path 278'.

Referring back to distinction subprocess 260 (FIG. 13), when query task 280 determines that quantity 225 in line segments field 212 for first path 272 is not equal to quantity 225 in line segments field 212 for second path 278, subprocess 260 proceeds to a task 286. At task 286, first path 272 is identified as distinct from second path 278.

However, when query task 280 determines that quantity 225 in line segments field 212 for first path 272 is equal to the quantity 225 in line segments field 212 for second path 278, subprocess 260 proceeds to a task 288. In other words, further analysis of first and second paths 272 and 278, respectively, is warranted to determine whether or not first and second paths 272 and 278 represent distinct wavefronts.

Task 288 causes processor 22 (FIG. 1) to calculate a path length difference between first path 272 and second path 278. Task 288 is readily accomplished by referring to path length 233 in path length field 216 (FIG. 12) of multipath components table 202 and obtaining path length ($l_{path}$) 233 for each of first path 272 and second path 278, or the adjusted path length, $l_{path}$(adjusted). Referring momentarily to table 202 (FIG. 12), suppose for example, path D, is now designated first path 272 and path G, which is distinguished as one of distinct multipath components 246, is now designated second path 278. Then the path length difference is as follows:

$$l_{path}(\text{diff}) = (d3 + l_{D2}) - (d7 + l_{G2})$$

In response to task 288, a query task 290 determines if the calculated path length difference, $l_{path}(\text{diff})$, is less than path length difference threshold 48 (FIG. 1). Path length difference threshold 48 represents the criterion for determining whether or not path length difference, $l_{path}(\text{diff})$, is different enough to represent a distinct wavefront of radiofrequency signal 56 (FIG. 3). Accordingly, when path length difference, $l_{path}(\text{diff})$, is greater than path length difference threshold 48, first and second paths 272 and 278 represent distinct wavefronts of radiofrequency signal 56 (FIG. 3). In a preferred embodiment, path length difference threshold 48 is set to be equivalent to local region side length 46 (FIG. 3).

Figure 15:
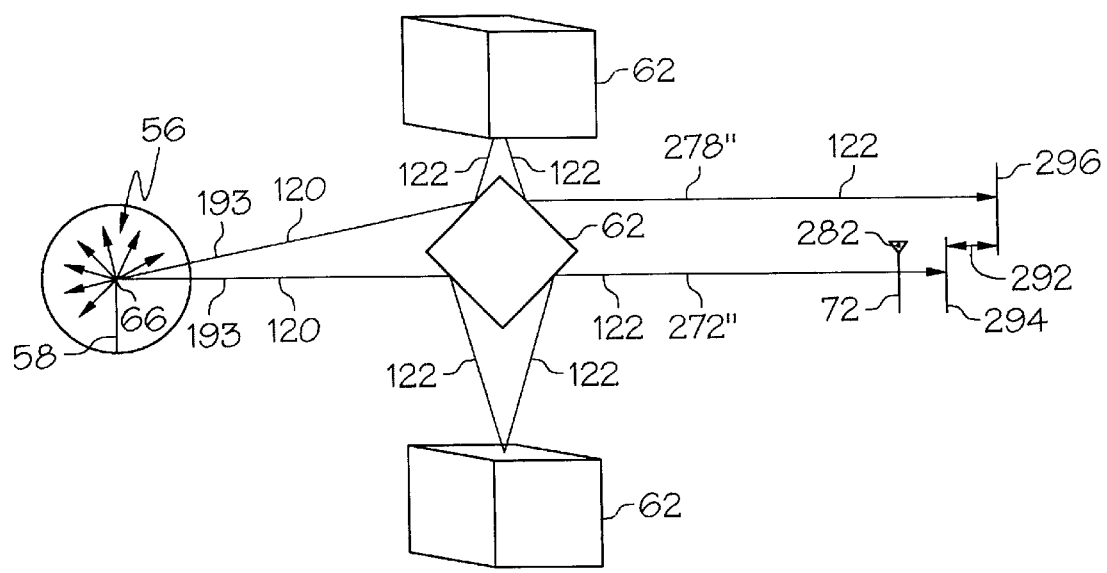
FIG. 15 shows a diagram of exemplary multipath components exhibiting different path lengths.

FIG. 15 shows a diagram of exemplary multipath components 193 exhibiting different path lengths. In this exemplary scenario, a first path 272" includes incident line segment 120 and three of reflection line segments 122. Likewise, a second path 278" includes incident line segment 120 and three of reflection line segments 122. A path length difference 292 is shown between a first wavefront 294 of radiofrequency signal 56 and a second wavefront 296 of radiofrequency signal 56. When path length difference 292 is greater than path length threshold 48, first wavefront 294 propagating along first path 272" is distinct from second wavefront 296 propagating along second path 278".

Referring back to distinction subprocess 260, when query task 290 determines that path length difference 292 (FIG. 15) is not less than path length threshold 48, distinction process 260 proceeds to task 286 where first path 272 (FIG. 15) is identified as being distinct from second path 278 (FIG. 15).

However, when query task 290 determines that path length difference 292 is less than path length threshold 48, subprocess 260 proceeds to a task 298. Beginning at task 298, first path 272 and second path 278 are further evaluated to determine whether or not they are distinct. In other words, at task 298, first and second paths 272 and 278 include the same quantity of line segments 120 and 122, and the length of each of first and second paths 272 and 278 are very similar (i.e., the difference between the two path lengths is less than threshold 48). Now, beginning at task 298 a determination is made as to whether or not the angles of arrival (discussed below) of radiofrequency signal 56 along each of first and second paths 272 and 278 are close enough.

Task 298 causes processor 22 (FIG. 1) to calculate a segment length difference between first path 272 and second path 278. Task 298 is readily accomplished by referring to local line segment length 231 in segment length field 214 (FIG. 12) of table 202 and obtaining segment length 231 for each of first path 272 and second path 278. Referring momentarily to table 202, suppose for example, path D, is now temporarily designated first path 272 and path G, which is distinguished as one of distinct multipath components 246, is now temporarily designated second path 278. The segment length difference is as follows:

$$l_{seg}(\text{diff}) = l_{D2} - l_{G2}$$

In response to task 298, a query task 300 determines if the calculated segment length difference, $l_{seg}(\text{diff})$, is less than segment length difference threshold 50 (FIG. 1). Segment length difference threshold 50 represents the criterion for determining whether or not segment length difference, $l_{seg}(\text{diff})$, hence the angle of arrival (discussed below), is different enough to represent a distinct wavefront of radiofrequency signal 56 (FIG. 3). When the segment length difference, $l_{seg}(\text{diff})$, is greater than segment length difference threshold 50, first path 272 and second paths 278 represent distinct wavefronts of radiofrequency signal 56 (FIG. 3).

Figure 16:
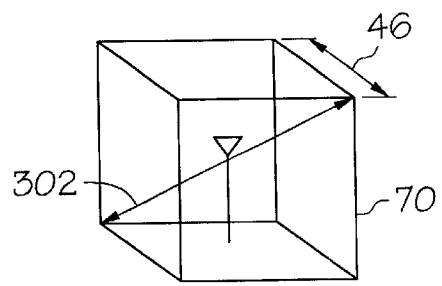
FIG. 16 shows a diagram of a cubic local region for determining segment length difference.

FIG. 16 shows a diagram of cubic local region 70 for determining segment length difference threshold 50. In a preferred embodiment, segment length difference threshold 50 is set to be equivalent to a maximum distance 302 within cubic local region 70. Since local region 70 is cube-shaped, maximum distance 302 is readily calculated to be local region side length 46 times the square root of three.

Figure 17:
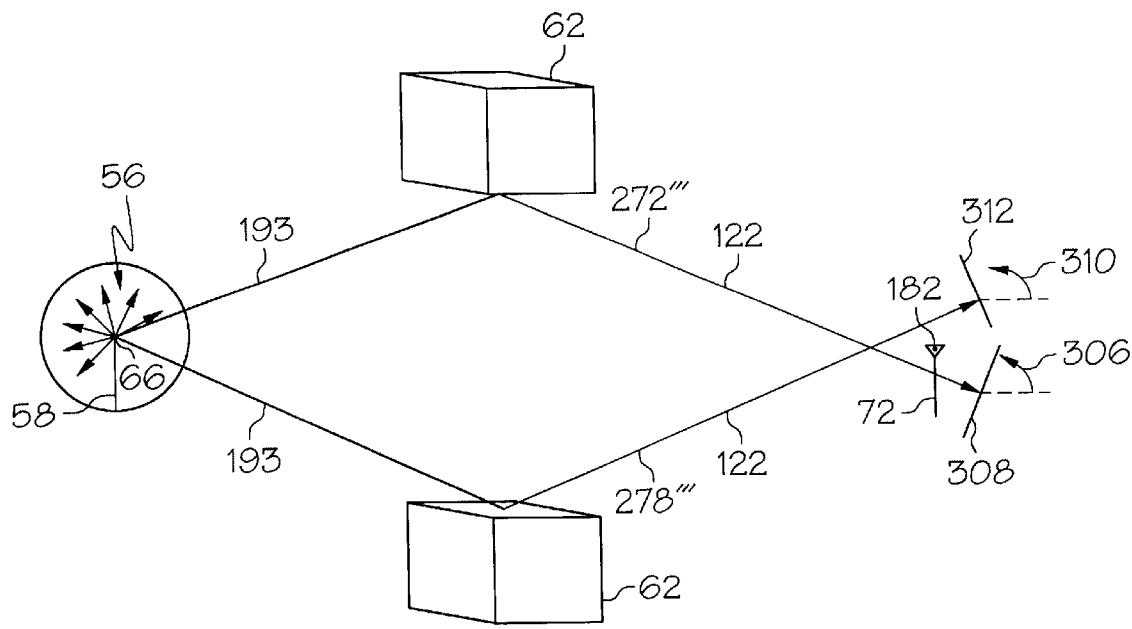
FIG. 17 shows a diagram of exemplary multipath components exhibiting different local line segment lengths.
Figure 18:
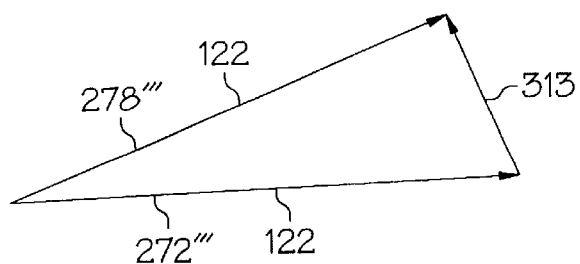
FIG. 18 shows a diagram representing a segment length difference between reflection line segments of the first and second paths of FIG. 17.

Referring to FIGS. 17 and 18, FIG. 17 shows a diagram of exemplary multipath components 193 exhibiting different local line segment lengths 231 (FIG. 12). In particular, FIG. 17 shows a first angle of arrival 306 for a first wavefront 308 of radiofrequency signal 56 along a first path 272''' and a second angle of arrival 310 for a second wavefront 312 of radiofrequency signal 56 along a second path 278'''. FIG. 18 shows a diagram representing a segment length difference 313 between reflection line segment 122 of first path 272''' and reflection line segment 122 of second path 278'''.

When segment length difference 313 is greater than segment length difference threshold 50, first and second angles of arrival 306 and 310, respectively, are great enough that first wavefront 308 propagating along first path 272''' is distinct from second wavefront 312 propagating along second path 278'''.

Referring back to distinction subprocess 260 (FIG. 13), when query task 300 determines that segment length difference 313 (FIG. 18) is not less than segment length difference threshold 50 (FIG. 1), distinction subprocess 260 proceeds to task 286 where first path 272 is identified as being distinct from second path 278.

However, when query task 300 determines that segment length difference 313 is less than segment length difference threshold 50, subprocess 260 proceeds to a task 314. When subprocess 260 reaches task 314, processor 22 (FIG. 1) identifies first path 272 as being indistinct from second path 278. That is, first path 272, representing one of multipath components 193 (FIG. 12) of subset 47 (FIG. 9), represents the same wavefront as does second path 278, previously identified as one of distinct multipath components 246. Accordingly, in response to task 314, first path 272 is discarded.

Following task 314, a query task 316 is performed. At query task 316, processor 22 determines if there is another one of distinct multipath components 246 in multipath component table 202 (FIG. 12). When there is another one of distinct multipath components 246, subprocess 260 loops back to task 274, to select the next one of distinct multipath components 246, temporarily designate it as second path 278, and compare it to the previously designated first path 272. Through this iterative process, first path 272 is compared with every one of distinct multipath components 246 previously identified.

However, when query task 316 determines that there are no other distinct multipath components 246 in multipath component table 202, distinction subprocess 260 exits. Alternatively, when task 286 identifies first path 272 as being distinct from second path 278, subprocess 260 exits. Of course, as discussed in connection with tasks 256 (FIG. 10) and 258 (FIG. 10) of distinct multipath identification process 38 (FIG. 10), all multipath components 193 (FIG. 12) are compared with all of distinct multipath components 246 (FIG. 12).

Distinct multipath components 246 represent distinct wavefronts of the multipaths, or the multiple propagation paths 54 (FIG. 3) of radiofrequency signal 56 (FIG. 3) that can cause signal distortion due to energy dissipation in each of the propagation paths 54, signal reinforcement and cancellation at receiver 72 (FIG. 3) because of the differences in arrival times for waves in the propagation paths having different path lengths, Doppler effects resulting from the direction of the propagation path (angle of arrival of the signal) at the receiver, and so forth. Through the execution of distinct multipath identification process 38, only distinct multipath components 246, representing distinct wavefronts of radiofrequency signal 56 will be counted as contributions to the overall power profile at receiver location 182 (FIG. 3).

Following identification of distinct multipath components 246, analysis processes 40 (FIG. 1) can be performed on distinct multipath components 246. Examples of analysis processes 40 are calculations of signal strength (i.e., quantity and/or lack of reflections), determination of interference caused by delay spreads of radiofrequency signal 56 (FIG. 3) arriving at receiver 72 (FIG. 3) at different times (i.e., path length differences), calculations of reflected energy at receiver 72 in response to the angle of arrival (i.e., segment length differences), and so forth.

In summary, the present invention teaches of a method and system for characterizing propagation of a radiofrequency signal in a three-dimensional environment. A database of propagation paths is created for a radiofrequency signal projecting from a transmitter at a fixed location in the three-dimensional environment. Database formation is performed without prior knowledge of the receiver location in the three-dimensional environment. The database can then be utilized to select multipath components of the radiofrequency signal at any of a number of receiver locations in three-dimensional environment. Utilizing the database, the multipath components are readily selected in the absence of previously performed power calculations. In addition, the present invention teaches of a series of tests that may be performed on the multipath components to identify multipath components representing distinct wavefronts of the radiofrequency signal at a receiver location which reduces ensuing analysis efforts.

Although the preferred embodiments of the invention have been illustrated and described in detail, it will be readily apparent to those skilled in the art that various modifications may be made therein without departing from the spirit of the invention or from the scope of the appended claims. The processes described herein may be executed on differing processors or the tasks described herein may be performed in a different order. Furthermore, as terrain databases become more detailed, so too, can the propagation path databases. In addition, the propagation path databases may be expanded to include propagation paths resulting from diffraction of the radiofrequency signal

What is claimed is:

1. A method for characterizing propagation of a radiofrequency signal in a three-dimensional environment comprising:

forming a database of propagation paths of said radiofrequency signal transmitted from a transmitter at a fixed location in said three-dimensional environment, said propagation paths being represented by a plurality of line segments in said database;

selecting local line segments from said plurality of line segments to establish a subset of said propagation paths, said local line segments being proximate a location of a receiver in said three-dimensional environment, and each of said propagation paths of said subset including one of said local line segments; and identifying distinct multipath components of said radiofrequency signal from said subset of said propagation paths.

2. A method as claimed in claim 1 wherein said forming operation comprises establishing said three-dimensional environment from a terrain database having reflective features of said three-dimensional environment stored therein.

3. A method as claimed in claim 2 wherein said terrain database includes a plurality of polygons describing said reflective features of said three-dimensional environment.

4. A method as claimed in claim 1 wherein each of said propagation paths includes an incident line segment originating at said transmitter, and said forming operation comprises:

setting a volume size for a local region to surround said receiver; and determining an angle of separation between each of said incident line segments in response to said setting operation such that at least one of said propagation paths intersects said local region.

5. A method as claimed in claim 4 wherein said setting operation comprises:

ascertaining a first distance between said fixed location of said transmitter and a farthest receiver location of a farthest receiver in said three-dimensional environment;

locating a reference point at a second distance, said second distance being greater than said first distance;

positioning a first local region exhibiting said volume size to surround said reference point;

positioning a second local region exhibiting said volume size immediately adjacent said first local region; and adjusting said angle of separation so that at least one of said incident line segments intersects each of said first and second local regions.

6. A method as claimed in claim 1 wherein each of said propagation paths includes an incident line segment originating at said transmitter, and said forming operation comprises:

determining an angle of separation between adjacent ones of said incident line segments; and projecting said radiofrequency signal along an azimuth and an elevation from said transmitter in response to said incident line segments of said propagation paths.

7. A method as claimed in claim 1 wherein said forming operation comprises:

a) projecting said radiofrequency signal from said transmitter in said three-dimensional environment;

b) tracking said propagation paths of said radiofrequency signal in said three-dimensional environment, said propagation paths including straight-line paths and reflection paths;

c) for each of said straight-line paths, storing a first one of said line segments in said database to represent said straight-line path; and d) for each of said reflection paths, storing second and third ones of said line segments in said database to represent said reflection path, said second and third line segments intersecting at an intersection location on a reflective feature in said three-dimensional environment.

8. A method as claimed in claim 7 wherein said operation c) comprises associating, in said database, said first line segment with location coordinates for said fixed location and a propagation direction of said radiofrequency signal from said fixed location.

9. A method as claimed in claim 7 wherein said operation d) comprises:

associating, in said database, said second line segment with first location coordinates for said fixed location and a first propagation direction of said radiofrequency signal from said fixed location; and associating, in said database, said third line segment with second location coordinates for said intersection location and a second propagation direction from said intersection location.

10. A method as claimed in claim 9 further comprising:

storing a fourth one of said line segments in said database, said fourth line segment intersecting said third line segment at a second intersection location on a second reflective feature in said three-dimensional environment; and associating, in said database, said fourth line segment with third location coordinates for said second intersection location and a third propagation direction from said second intersection location.

11. A method as claimed in claim 7 further comprising:

determining a first length for said reflection path responsive to said fixed location and said intersection location;

storing said first length in said database;

establishing an end point for said third line segment;

determining a second length for said reflection path responsive to said intersection location and said end point; and obtaining a cumulative length of said reflection path from said first and second lengths.

12. A method as claimed in claim 1 wherein said forming operation comprises:

projecting said radiofrequency signal from said transmitter in said three-dimensional environment;

tracking said propagation paths of said radiofrequency signal in said three-dimensional environment, said propagation paths including reflection paths represented by consecutive ones of said line segments;

establishing a reflection threshold; and storing said consecutive line segments in said database when a quantity of said consecutive line segments is less than said reflection threshold.

13. A method as claimed in claim 12 wherein said three-dimensional environment has a boundary, and said forming operation further comprises:

detecting an intersection of one of said consecutive line segments with said boundary; and ceasing said storing operation for said one of said propagation paths in response to said detecting operation.

14. A method as claimed in claim 1 further comprising:

receiving location coordinates for said location of said receiver following said forming operation; and establishing said location of said receiver in said three-dimensional environment in response to said received location coordinates.

15. A method as claimed in claim 1 wherein said selecting operation comprises:

establishing a local region in which said receiver is located; and distinguishing said local line segments as ones of said plurality of line segments in said database that intersect said local region.

16. A method as claimed in claim 1 wherein said subset of said propagation paths includes straight-line paths originating at said transmitter, a first one of said local line segments represents a first one of said straight-line paths, a second one of said local line segments represents a second one of said straight-line paths, and said identifying operation comprises:

calculating a first distance between said first local line segment and said location of said receiver;

calculating a second distance between said second local line segment and said location of said receiver;

determining a shorter distance of said first and second distances; and selecting one of said first and second local line segments exhibiting said shorter distance as one of said distinct multipath components.

17. A method as claimed in claim 1 wherein said identifying operation comprises:

determining a first quantity of said line segments representing a first propagation path from said subset of propagation paths;

determining a second quantity of said line segments representing a second propagation path from said subset of propagation paths; and selecting said first and said second propagation paths as said distinct multipath components when said first quantity and said second quantity differ.

18. A method as claimed in claim 17 wherein when said first and said second quantities are at least two and said second quantity is equivalent to said first quantity, said identifying operation further comprises:

a) ascertaining a first path length for said first propagation path between said transmitter and a first point along said first propagation path proximate said location of said receiver;

b) ascertaining a second path length of said second propagation path between said transmitter and a second point along said second propagation path proximate said location of said receiver;

c) calculating a path length difference in response to said first and said second path lengths; and d) selecting one of said first and second propagation paths as one of said distinct multipath components when said path length difference is less than a predetermined difference threshold.

19. A method as claimed in claim 18 further comprising:

establishing a local region surrounding said receiver, said local region bounded by sides exhibiting a common length; and setting said predetermined difference threshold to be substantially equal to said common length.

20. A method as claimed in claim 18 wherein said first point is located on a first one of said local line segments of said first propagation path, said second point is located on a second one of said local line segments of said second propagation path, and said operation c) comprises:

computing a first distance of a first line between said first point and said receiver location, said first line being substantially perpendicular to said first local line segment;

adjusting said first path length to be an adjusted first path length equivalent to the hypotenuse of a first right triangle having a first side defined by said first distance and a second side defined by said first path length;

computing a second distance of a second line between said second point and said receiver location, said second line being substantially perpendicular to said second local line segment;

adjusting said second path length to be an adjusted second path length equivalent to the hypotenuse of a second right triangle having a third side defined by said second distance and a fourth side defined by said second path length; and computing said path length difference as a difference between said first and second adjusted path lengths.

21. A method as claimed in claim 18 further comprising:

calculating a first distance between said first point on said first propagation path and said location of said receiver;

calculating a second distance between said second point on said second propagation path and said location of said receiver;

determining a shorter distance of said first and second distances; and when said path length difference is less than said predetermined difference threshold, choosing one of said first and second propagation paths exhibiting said shorter distance.

22. A method as claimed in claim 18 wherein said identifying operation further comprises:

ascertaining a first segment length for a first one of said local line segments of said first propagation path when said path length difference is greater than said predetermined difference threshold;

ascertaining a second segment length for a second one of said local line segments of said second propagation path when said path length difference is greater than said predetermined difference threshold;

calculating a segment length difference between said first and said second segment lengths;

when said segment length difference is less than a segment length difference threshold, selecting one of said first and second propagation paths as one of said distinct multipath components; and when said segment length difference is greater than said segment length difference threshold, selecting said first and second propagation paths as said distinct multipath components.

23. A method as claimed in claim 22 further comprising:

establishing a cubic local region surrounding said receiver, said cubic local region described by sides exhibiting a common length; and deriving said segment length difference threshold from said common length of said sides.

24. A method as claimed in claim 22 further comprising:

calculating a first distance between said first point on said first propagation path and said location of said receiver;

calculating a second distance between said second point on said second propagation path and said location of said receiver;

determining a shorter distance of said first and second distances; and when said segment length difference is less than said segment length difference threshold, choosing one of said first and second propagation paths exhibiting said shorter distance.

25. A method as claimed in claim 1 further comprising:

establishing a second location for a second receiver in said three-dimensional environment; and repeating said selecting and said identifying operations for said second location.

26. A method of forming a database for storing propagation characteristics of a radiofrequency signal transmitted from a transmitter at a fixed location in a three-dimensional environment comprising:

a) identifying reflective features of said three-dimensional environment;

b) establishing said three-dimensional environment from a terrain database having said reflective features of said three-dimensional environment stored therein;

c) determining an angle of separation between adjacent ones of incident line segments representing propagation paths of said radiofrequency signal from said fixed location;

d) projecting said radiofrequency signal along an azimuth and an elevation from said transmitter in response to said incident line segments;

e) tracking said propagation paths in said three-dimensional environment, said propagation paths including straight-line paths and reflection paths;

f) for each of said straight-line paths, storing a first one of said incident line segments in said database to represent said straight-line path; and g) for each of said reflection paths, storing a second one of said incident line segments and a reflection line segment in said database to represent said reflection path, said second incident line segment and said reflection line segment intersecting at an intersection location on a reflective feature in said three-dimensional environment.

27. A method as claimed in claim 26 wherein said operation c) comprises:

setting a volume size for a local region;

ascertaining a first distance between said fixed location and a farthest receiver location;

locating a reference point at a second distance, said second distance being greater than said first distance;

positioning a first local region exhibiting said volume size to surround said reference point;

positioning a second local region exhibiting said volume size immediately adjacent said first local region; and adjusting said angle of separation so that at least one of said incident line segments intersects each of said first and second local regions.

28. A method as claimed in claim 26 wherein said operation f) comprises associating, in said database, said first incident line segment with location coordinates for said fixed location and a propagation direction of said radiofrequency signal from said fixed location.

29. A method as claimed in claim 26 wherein said operation g) comprises:

associating, in said database, said second incident line segment with location coordinates for said fixed location and a propagation direction of said radiofrequency signal from said fixed location; and associating, in said database, said reflection line segment with second location coordinates for said intersection location and a second propagation direction from said intersection location.

30. A method as claimed in claim 29 wherein said reflective feature is a first reflective feature, said intersection location is a first intersection location, said reflection line segment is a first reflection line segment, and said operation g) further comprises:

storing a second reflection line segment in said database, said second reflection line segment intersecting said first reflection line segment at a second intersection location on a second reflective feature in said three-dimensional environment; and associating, in said database, said second reflection line segment with third location coordinates for said second intersection location and a third propagation direction from said second intersection location.

31. A method as claimed in claim 26 wherein said operation g) comprises:

determining a first length for said reflection path responsive to said fixed location and said intersection location;

storing said first length in said database;

establishing an end point for said reflection line segment;

determining a second length for said reflection path responsive to said intersection location and said end point; and obtaining a cumulative length of said reflection path from said first and second lengths.

32. A method as claimed in claim 26 further comprising:

establishing a reflection threshold; and for each of said reflection paths, storing consecutive ones of said reflection line segments in said database when a quantity of said consecutive ones of said reflection lines segments is less than said reflection threshold.

33. A system for determining propagation characteristics of a radiofrequency signal between a transmitter location and each of a plurality of receiver locations in a three-dimensional environment comprising:

a memory element having a database of propagation paths stored therein, said propagation paths being represented by a plurality of line segments, and said propagation paths originating at said transmitter location and radially projecting from said transmitter location along an azimuth and an elevation such that adjacent ones of said propagation paths are spaced apart by an angle of separation;

a location coordinates receiver for receiving location coordinates for one of said receiver locations; and a segment selector for selecting, in response to said location coordinates, local line segments from said plurality of line segments in said database to establish a subset of said propagation paths, said local line segments being proximate said one of said receiver locations, and each of said propagation paths of said subset including one of said local line segments.

34. A system as claimed in claim 33 wherein said system additionally comprises:

a size establisher for establishing a volume size for a local region surrounding said one of said receiver locations; and said segment selector further comprises an intersection detector for determining ones of said line segments in said database that intersect said local region to select said local line segments.

35. A system as claimed in claim 33 further comprising a multipath identifier for identifying distinct multipath components of said radiofrequency signal from said subset of said propagation paths.

36. A method as claimed in claim 35 wherein said step d) further comprises the steps of:

determining a shorter distance between each of said propagation paths of said first portion and said receiver location in response to said step a); and choosing said one of said propagation paths of said first portion exhibiting said shorter distance.

37. A method for identifying distinct multipath components from a set of propagation paths of a radiofrequency signal propagating between a transmitter at a fixed location and a receiver at a receiver location in a three-dimensional environment, said set of propagation paths being represented by line segments in a database, said method comprising the steps of:

a) for each of said propagation paths, calculating a distance between said receiver location and a point on one of said line segments representing said propagation path that is substantially closest to said receiver location;

b) for each of said propagation paths, determining a quantity of said line segments representing said propagation path between said fixed location and said point;

c) distinguishing a first portion of said propagation paths in which said quantity is one;

d) selecting one of said propagation paths of said first portion as one of said distinct multipath components;

e) distinguishing a second portion of said propagation paths in which said quantity is at least two;

f) determining a first quantity of said line segments representing a first propagation path from said second portion of said propagation paths;

g) determining a second quantity of said line segments representing a second propagation path from said second portion of said propagation paths; and h) selecting said first and said second propagation paths as said distinct multipath components when said first quantity and said second quantity differ.

38. A method as claimed in claim 37 further comprising the steps of:

ascertaining a first path length for said first propagation path between said transmitter and a first point along said first propagation path proximate said location of said receiver when said first quantity and said second quantity are equivalent;

ascertaining a second path length for said second propagation path between said transmitter and a second point along said second propagation path proximate said location of said receiver when said first quantity and said second quantity are equivalent;

calculating a path length difference between said first and said second path lengths; and selecting one of said first and second propagation paths as one of said distinct multipath components when said path length difference is less than a predetermined difference threshold.

39. A method as claimed in claim 38 further comprising the steps of:

establishing a local region surrounding said receiver, said local region bounded by sides exhibiting a common length; and setting said predetermined difference threshold to be substantially equal to said common length.

40. A method as claimed in claim 38 wherein said step of selecting said one of said first and second propagation paths comprises the steps of:

determining a shorter distance between each of said first and second propagation paths and said receiver location in response to said step a); and choosing said one of said first and second propagation paths exhibiting said shorter distance.

41. A method as claimed in claim 40 wherein when said segment length difference is less than said segment length difference threshold, said method further comprises the steps of:

determining a shorter distance between each of said first and second propagation paths and said receiver location in response to said step a); and choosing said one of said first and second propagation paths exhibiting said shorter distance.

42. A method as claimed in claim 38 further comprising the steps of:

ascertaining a first segment length for a first one of said line segments of said first propagation path when said path length difference is greater than said predetermined difference threshold, said first line segment being proximate said receiver location;

ascertaining a second segment length for a second one of said line segments of said second propagation path when said path length difference is greater than said predetermined difference threshold, said second line segment being proximate said receiver location;

calculating a segment length difference between said first and said second segment lengths;

when said segment length difference is less than a segment length difference threshold, selecting one of said first and second propagation paths as one of said distinct multipath components; and when said segment length difference is greater than said segment length difference threshold, selecting said first and second propagation paths as said distinct multipath components.

43. A method as claimed in claim 42 further comprising the steps of:

establishing a local region surrounding said receiver, said local region being bounded by squares, each of said squares having sides exhibiting a common length; and deriving said segment length difference threshold from said common length of said local region.

* * * * *